US010673354B2

(12) United States Patent
Wada et al.

(10) Patent No.: US 10,673,354 B2
(45) Date of Patent: Jun. 2, 2020

(54) POWER CONVERSION DEVICE

(71) Applicant: Mitsubishi Electric Corporation, Chiyoda-ku (JP)

(72) Inventors: Toshihiro Wada, Chiyoda-ku (JP); Hiroki Ishihara, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 16/494,615

(22) PCT Filed: May 19, 2017

(86) PCT No.: PCT/JP2017/018870
§ 371 (c)(1),
(2) Date: Sep. 16, 2019

(87) PCT Pub. No.: WO2018/211694
PCT Pub. Date: Nov. 22, 2018

(65) Prior Publication Data
US 2020/0091838 A1 Mar. 19, 2020

(51) Int. Cl.
*H02M 3/155* (2006.01)
*H02M 7/797* (2006.01)
(Continued)

(52) U.S. Cl.
CPC ........... *H02M 7/797* (2013.01); *H02M 1/088* (2013.01); *H02M 1/14* (2013.01)

(58) Field of Classification Search
CPC .......... H02M 7/72; H02M 7/79; H02M 7/797; H02M 1/088; H02M 1/14; H02M 1/143;
(Continued)

(56) References Cited

U.S. PATENT DOCUMENTS

2013/0334884 A1* 12/2013 Arisawa ................. H02M 1/32
307/43
2015/0207424 A1* 7/2015 Okamoto .......... H02M 3/33569
363/17
(Continued)

FOREIGN PATENT DOCUMENTS

JP 2002-345243 A 11/2002
JP 2005-33867 A 2/2005
(Continued)

OTHER PUBLICATIONS

International Search Report dated Aug. 1, 2017 in PCT/JP2017/018870 filed May 19, 2019.

*Primary Examiner* — Adolf D Berhane
(74) *Attorney, Agent, or Firm* — Oblon, McClelland, Maier & Neustadt, L.L.P.

(57) ABSTRACT

A power conversion device includes: a first smoothing circuit connected to a first electric device; a second smoothing circuit connected to a second electric device; a first bridge circuit connected to the first smoothing circuit; a transformer having a primary side connected to a third electric device and a secondary side connected to the first bridge circuit and the second smoothing circuit; and a controller, wherein the controller varies a duty ratio of the first bridge circuit at a frequency higher than cutoff frequencies of the first and second smoothing circuits, controls a constant component of the duty ratio to control power exchange between the first and second electric devices, and controls a phase of a varying component of the duty ratio to control power exchange to and from the third electric device.

20 Claims, 11 Drawing Sheets

(51) Int. Cl.
*H02M 1/088* (2006.01)
*H02M 1/14* (2006.01)

(58) Field of Classification Search
CPC ...... H02M 1/096; H02M 3/135; H02M 3/155; H02M 3/137; H02M 1/06
See application file for complete search history.

(56) References Cited

U.S. PATENT DOCUMENTS

| | | | | |
|---|---|---|---|---|
| 2016/0056715 | A1* | 2/2016 | Arisawa | H02M 1/34 |
| | | | | 323/282 |
| 2017/0352523 | A1* | 12/2017 | Kasai | H05H 1/46 |
| 2018/0269794 | A1* | 9/2018 | Arimoto | H02M 3/33569 |
| 2019/0312520 | A1* | 10/2019 | Yoshimitsu | H02M 3/33592 |

FOREIGN PATENT DOCUMENTS

| | | | |
|---|---|---|---|
| JP | 2008-312394 | A | 12/2008 |
| JP | 2009-171776 | A | 7/2009 |
| JP | 2011-244523 | A | 12/2011 |

\* cited by examiner

POWER CONVERSION DEVICE

TECHNICAL FIELD

The present invention relates to a power conversion device that performs power conversion and controls power transmission among three or more of a power source, a load, and/or a power storage device without using a plurality of power conversion circuits.

BACKGROUND ART

Conventionally, to control power transmission among three or more electric devices using a power conversion device, it has been necessary to provide power conversion devices for the individual electric devices. A small-sized and light-weight power conversion device at low cost having a function of controlling power transmission among three or more electric devices is needed.

To solve this problem, a power conversion device is disclosed which includes a transformer having three or more coils magnetically coupled with each other and controls AC voltage to be applied to each coil, using a full-bridge circuit provided for each coil (for example, Patent Document 1). Another power conversion device is disclosed which controls power transmission between first and second electric devices by a bidirectional chopper composed of an inductor and a half-bridge circuit having switching elements, and uses the inductor as a secondary-side coil of a transformer, to enable power supply to a third electric device (for example, Patent Documents 2, 3). Also, a power conversion device using a step up/down bidirectional chopper instead of the above bidirectional chopper is disclosed (for example, Patent Document 4). Still another power conversion device is disclosed in which power transmission between first and second electric devices and power transmission between a third electric device and the first or second electric device are temporally separated from each other and the self-inductance of a transformer is switched in accordance with the situation (for example, Patent Document 5).

CITATION LIST

Patent Document

Patent Document 1: Japanese Laid-Open Patent Publication No. 2011-244523 (paragraphs [0010], [0046], [0048], [0058], and FIGS. 1, 4)

Patent Document 2: Japanese Laid-Open Patent Publication No. 2002-345243 (paragraphs [0007], [0020]-[0024], and FIG. 3)

Patent Document 3: Japanese Laid-Open Patent Publication No. 2009-171776 (paragraphs [0009], [0042], [0045], [0107], [0121], [0122], and FIG. 1)

Patent Document 4: Japanese Laid-Open Patent Publication No. 2005-33867 (paragraphs [0007], [0023]-[0028], and FIG. 1)

Patent Document 5: Japanese Laid-Open Patent Publication No. 2008-312394 (paragraphs [0008], [0015], [0017], [0024], [0026], [0027], [0029], and FIGS. 1, 2)

SUMMARY OF THE INVENTION

Problems to be Solved by the Invention

However, the invention disclosed in Patent Document 1 requires full-bridge circuits and coils the numbers of which correspond to the number of electric devices, and thus has a problem in cost reduction, downsizing, and weight reduction of the power conversion device. In the inventions disclosed in Patent Documents 2 to 4, there are contradicting requirements that, to obtain DC current between the first and second electric devices, the transformer secondary-side coil needs to cut off ripple current, and meanwhile, to supply power to the third electric device, the transformer secondary-side coil needs to allow ripple current to pass, leading to reduction in power transmission efficiency. The invention disclosed in Patent Document 5 solves this problem but has a problem that it is impossible to transmit power between the first and second electric devices and power transmission between the third electric device and the first or second electric device at the same time.

The present invention has been made to solve the above problems, and aims to provide a power conversion device capable of transmitting power among three electric devices at the same time and with high efficiency.

Solution to the Problems

A power conversion device according to the present invention includes: a first smoothing circuit connected to a first electric device; a second smoothing circuit connected to a second electric device; a first bridge circuit connected to the first smoothing circuit; a transformer having a primary side connected to a third electric device and a secondary side connected to the first bridge circuit and the second smoothing circuit; and a controller for performing switching control of the first bridge circuit, wherein the controller varies a duty ratio of the first bridge circuit at a frequency higher than a cutoff frequency of the first smoothing circuit and a cutoff frequency of the second smoothing circuit, and the controller controls a constant component of the duty ratio to control power exchange between the first electric device and the second electric device, and at the same time, controls a phase of a varying component of the duty ratio to control power exchange to and from the third electric device.

Effect of the Invention

In the power conversion device according to the present invention, the controller varies the duty ratio of the first bridge circuit at a frequency higher than the cutoff frequency of the first smoothing circuit and the cutoff frequency of the second smoothing circuit, and the controller controls the constant component of the duty ratio to control power exchange between the first electric device and the second electric device, and at the same time, controls the phase of the varying component of the duty ratio to control power exchange to and from the third electric device. Thus, it becomes possible to control power transmission among three or more electric devices while performing the power transmission efficiently, with a small-sized and light-weight configuration.

DESCRIPTION OF EMBODIMENTS

Embodiment 1

Figure 1:
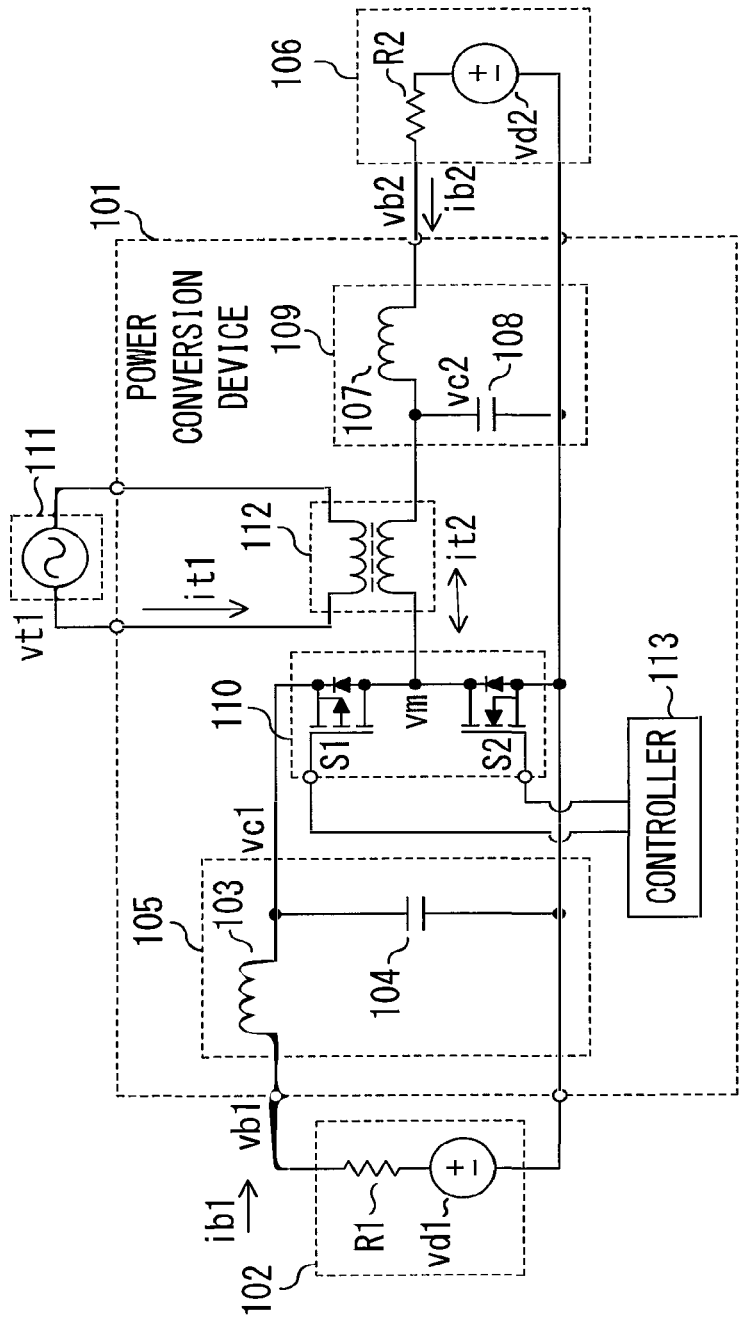
FIG. 1 is a configuration diagram of a power conversion device according to embodiment 1 of the present invention.

Embodiment 1 relates to a power conversion device including: a first smoothing circuit connected to a first electric device; a second smoothing circuit connected to a second electric device; a first bridge circuit connected to the first smoothing circuit; a transformer having a primary side connected to the third electric device and a secondary side connected to the first bridge circuit and the second smoothing circuit; and a controller for performing switching control of the bridge circuit, wherein the controller varies a duty ratio of the bridge circuit at a frequency higher than cutoff frequencies of the first and second smoothing circuits, and the controller controls a constant component of the duty ratio to control DC current flowing between the first electric device and the second electric device, and at the same time, controls the phase of a varying component of the duty ratio.

Hereinafter, the configuration and operation of the power conversion device according to embodiment 1 of the present invention will be described with reference to FIG. 1 which is a configuration diagram of the power conversion device, FIG. 2 which illustrates a control method for a duty ratio, FIG. 3 which illustrates the relationship between a control amount and power transmission, FIG. 4 which is a block diagram of a controller, and FIG. 5 which is another configuration diagram of the power conversion device.

First, the entire configuration of the power conversion device according to embodiment 1 will be described with reference to FIG. 1.

A power conversion device 101 includes, as main components, a first smoothing circuit 105, a second smoothing circuit 109, a first half-bridge circuit 110, a transformer 112, and a controller 113. A first electric device 102, a second electric device 106, and a third electric device 111 are connected to the power conversion device 101.

Here, the first smoothing circuit 105 includes a first inductor 103 and a first capacitor 104, and the second smoothing circuit 109 includes a second inductor 107 and a second capacitor 108. The first half-bridge circuit 110 includes switching elements S1 and S2.

In the following description of embodiment 1, unless needed to be discriminated, the first half-bridge circuit 110 is referred to as half-bridge circuit 110.

Next, the relationship between the main components of the power conversion device 101 and the three electric devices will be described.

The first smoothing circuit 105 is connected to the first electric device 102, and the second smoothing circuit 109 is connected to the second electric device 106. Further, the half-bridge circuit 110 is connected to the first smoothing circuit 105.

The third electric device 111 is connected to the primary side of the transformer 112, and the half-bridge circuit 110 and the second smoothing circuit 109 are connected to the secondary side of the transformer 112.

The controller 113 is connected to the half-bridge circuit 110 and controls the switching elements S1 and S2.

In embodiment 1, the first electric device 102 and the second electric device 106 transmit and receive power to and from each other with DC current. The third electric device 111 operates as an AC voltage source, and transmits and receives power to and from the first electric device 102 and the second electric device 106 through control of the phase of the AC current thereof.

The half-bridge circuit 110 is subjected to switching control by the controller 113 such that AC voltage having a lower frequency than the switching frequency of the half-bridge circuit 110 is applied to the secondary side of the transformer 112. The secondary-side self-inductance of the transformer 112 is designed so as to suppress ripple current having the switching frequency and allow AC current having a frequency corresponding to the AC voltage to pass. Thus, the transformer 112 performs power exchange between the primary side and the secondary side of the transformer 112 in accordance with the phase difference between AC voltage on the secondary side of the transformer 112 and AC voltage of the third electric device 111.

The first smoothing circuit 105 and the second smoothing circuit 109 are designed so as to cut off AC current corresponding to AC voltage on the secondary side of the transformer 112 and allow DC current to pass. Thus, AC power from the third electric device 111 is transmitted via the transformer 112 to the secondary-side coil of the transformer 112. The AC power from the third electric device 111 is reflected by the second smoothing circuit 109 and converted from AC to DC by the half-bridge circuit 110 and the first smoothing circuit 105, to be transmitted to the first electric device 102.

At the same time, by DC current flowing through the secondary-side coil of the transformer 112, power is transmitted from the first electric device 102 to the second electric device 106. All of the power exchanges described above can be performed bidirectionally.

Therefore, the power conversion device 101 according to embodiment 1 is capable of performing power transmission among the three electric devices optionally and bidirectionally. In addition, the power conversion device 101 according to embodiment 1 does not have power converters for individual electric devices and does not use a transformer having coils for individual electric devices, and therefore size reduction and cost reduction can be achieved.

Further, the power conversion device 101 according to embodiment 1 does not have contradicting design requirements regarding the inductance of the transformer 112, and therefore can transmit power with high efficiency, thus achieving energy saving.

Next, operation of the power conversion device 101 according to embodiment 1 will be described with reference to FIG. 1.

First, where the open circuit voltage of the first electric device 102 is vd1 and the internal resistance of the first electric device 102 is R1, voltage of the first electric device 102 is represented as $vb1=vd1-R1 \cdot ib1$. Similarly, where the open circuit voltage of the second electric device 106 is vd2 and the internal resistance thereof is R2, voltage of the second electric device 106 is represented as vb2=vd2−R2·ib2. Here, ib1 and ib2 are currents flowing into the power conversion device 101 from the first and second electric device 102 and 106, respectively.

The controller 113 drives the switching elements S1 and S2 of the half-bridge circuit 110 complementarily with each other. That is, when the switching element S1 conducts current, the switching element S2 does not conduct current. When the switching element S1 does not conduct current, the switching element S2 conducts current.

Here, it is assumed that the switching element S1 is controlled by pulse width modulation (PWM). Where the duty ratio of the switching element S1 is ρ and here, ρ is assumed to be a constant value (denoted by pd), the midpoint voltage of the half-bridge circuit 110 is represented as pd·vb1+vn. Here, vn is ripple due to switching.

Hereinafter, the average midpoint voltage pd·vb1 is denoted by vm.

When the average midpoint voltage vm is greater than the voltage vb2 of the second electric device 106, DC current from the first electric device 102 to the second electric device 106 increases. While the DC current increases, the voltage vb1 of the first electric device 102 decreases due to the internal resistance of the first electric device 102, and vb2 increases due to the internal resistance of the second electric device 106. As a result, the increase in the DC current stops when the average midpoint voltage vm becomes equal to vb2.

In contrast, when the average midpoint voltage vm is smaller than vb2, DC current from the first electric device 102 to the second electric device 106 decreases. While the DC current decreases, vb1 increases due to the internal resistance of the first electric device 102 and vb2 decreases due to the internal resistance of the second electric device 106. As a result, the decrease in the DC current stops when the average midpoint voltage vm becomes equal to vb2.

The above operation has been described under the assumption that DC current flows from the first electric device 102 to the second electric device 106. However, the DC current may be negative. In this case, the DC current flows from the second electric device 106 to the first electric device 102.

Next, a specific method for calculating the current value will be described.

Assuming that the average midpoint voltage vm is equal to the voltage vb2 of the second electric device 106, Expression (1) is obtained.

$$pd(vd1-R1 \cdot ib1) = vd2 - R2 \cdot ib2 \tag{1}$$

Meanwhile, since the current ib2 is distributed in accordance with the duty ratio pd in the half-bridge circuit 110, Expression (2) is obtained.

$$ib1 = -pd \cdot ib2 \tag{2}$$

By solving Expression (1) and Expression (2), current when the duty ratio is pd is calculated as shown in Expression (3).

$$ib1 = (vd1/(R2+pd^2 \cdot R1)) \cdot pd(pd-\rho 0)$$

$$ib2 = (-vd1/(R2+pd^2 \cdot R1)) \cdot (pd-\rho 0) \tag{3}$$

Here, ρ0 is vd2/vd1, i.e., (open circuit voltage of second electric device 106/open circuit voltage of first electric device 102).

Next, under the condition that DC current flows through the secondary-side coil of the transformer 112 and the average midpoint voltage vm is equal to vb2, it is assumed that the duty ratio ρ is varied in an oscillating manner at a frequency higher than the cutoff frequencies of the first smoothing circuit 105 and the second smoothing circuit 109. That is, where the AC voltage is denoted by vs, Expression (4) is obtained.

$$vm = vb2 + vs + vn \tag{4}$$

If the capacitances of the capacitors 104 and 108 included in the first smoothing circuit 105 and the second smoothing circuit 109 are sufficiently large, voltages vc1 and vc2 of the capacitors 104 and 108 are kept at vb1 and vb2 irrespective of the AC voltage. Therefore, voltage applied to the secondary-side coil of the transformer 112 is represented by Expression (5).

$$vt2 = vs + vn = \rho vb1 - vb2 + vn \tag{5}$$

Here, operation of the transformer 112 will be considered. Where the voltage on the primary side of the transformer is vt1 and AC currents on the primary side and the secondary side of the transformer are it1 and it2, respectively, Expressions (6) and (7) are satisfied.

$$(d/dt)it1 = (Lt2/(Lt1 \cdot Lt2 - Mt^2)) \cdot vt1 - (Mt/(Lt1 \cdot Lt2 - Mt^2)) \cdot vt2 \tag{6}$$

$$(d/dt)it2 = -(Mt/(Lt1 \cdot Lt2 - Mt^2)) \cdot vt1 + (Lt1/(Lt1 \cdot Lt2 - Mt^2)) \cdot vt2 \tag{7}$$

Here, Lt1 and Lt2 are the self-inductances on the primary side and the secondary side of the transformer 112, and Mt is the mutual inductance of the transformer 112. Here, the primary-side voltage vt1 of the transformer 112 is assumed to be represented by Expression (8).

$$vt1 = va1 \cdot \sin \omega at \tag{8}$$

Here, va1 is the amplitude of the primary-side voltage of the transformer 112, and ωa is the angular frequency of the primary-side voltage of the transformer 112. At this time, the AC voltage vs is controlled as shown by Expression (9).

$$vs = va2 \cdot \sin(\omega at + \theta) \tag{9}$$

Here, va2 is the amplitude of the secondary-side AC voltage of the transformer 112, and θ is a phase difference of the secondary-side AC voltage of the transformer 112 relative to the primary-side voltage vt1 of the transformer 112.

By substituting Expression (9) into Expression (5) and then substituting Expression (8) together with this into Expression (6), Expression (10) is obtained.

$$(d/dt)it1 = ((Lt2 \cdot va1)/(Lt1 \cdot Lt2 - Mt^2)) \cdot \sin \omega at - ((Mt \cdot va2)/(Lt1 \cdot Lt2 - Mt^2)) \cdot \sin(\omega at + \theta) - (Mt/(Lt1 \cdot Lt2 - Mt^2)) \cdot vn \tag{10}$$

Here, since vn is high-frequency ripple, vn becomes zero when integrated, and thus Expression (11) is obtained.

$$it1 = -((Lt2 \cdot va1)/(\omega a(Lt1 \cdot Lt2 - Mt^2))) \cdot \cos \omega at + ((Mt \cdot va2)/(\omega a(Lt1 \cdot Lt2 - Mt^2))) \cdot \cos(\omega at + \theta) \tag{11}$$

At this time, power consumption Pb3 of the third electric device 111 is represented by Expression (12) from orthogonality of a trigonometric function, and power transmission to the third electric device 111 can be controlled through control of the phase θ.

[Mathematical 1]

$$Pb3 = \frac{\omega a}{2\pi}\int_{-\pi/\omega a}^{\pi/\omega a} vt1 it1\, dt = \frac{Mt va1 va2}{2\omega a(Lt1 Lt2 - Mt^2)}\sin\theta \qquad (12)$$

Similarly, Expression (13) is obtained from Expression (7).

$(d/dt)it2 = -((Mt \cdot va1)/(Lt1 \cdot Lt2 - Mt^2))\cdot \sin \omega at + ((Lt1 \cdot va2)/(Lt1 \cdot Lt2 - Mt^2))\cdot \sin(\omega at + \theta) + (Mt/(Lt1 \cdot Lt2 - Mt^2))\cdot vn$ (13)

Since vn is high-frequency ripple, vn becomes 0 when integrated, and thus Expression (14) is obtained.

$it2 = ((Mt \cdot va1)/(\omega a(Lt1 \cdot Lt2 - Mt^2)))\cdot \cos \omega at - ((Lt1 \cdot va2)/(\omega a(Lt1 \cdot Lt2 - Mt^2)))\cdot \cos(\omega at + \theta)$ (14)

Here, the AC current it2 on the secondary side of the transformer 112 is sufficiently smooth as compared to the switching frequency. Therefore, current to the smoothing circuit 105 side of the half-bridge circuit 110 is distributed in accordance with the duty ratio ρ. That is, current to the smoothing circuit 105 side of the half-bridge circuit 110 is ρ·it2.

From Expression (5) and Expression (9), Expression (15) is obtained.

$\rho = \rho d + \rho a \cdot \sin(\omega at + \theta) = (vb2/vb1) + (va2/vb1)\cdot \sin(\omega at + \theta)$ (15)

Here, ρa is vb2/vb1, i.e., (voltage of second electric device 106/voltage of first electric device 102).

Owing to the action of the smoothing circuit 105, AC current is smoothed. Therefore, current flowing to the first electric device 102 is represented by Expression (16), except for DC current.

[Mathematical 2]

$$-\frac{\omega a}{2\pi}\int_{-\pi/\omega a}^{\pi/\omega a} \rho it2\, dt = -\frac{Mt va1}{2\omega a(Lt1 Lt2 - Mt^2)}\rho a \sin\theta \qquad (16)$$

Power Pb1 flowing from the first electric device 102 into the power conversion device 101, including DC current, is represented by Expression (17).

$Pb1 = ((vb2 \cdot vd1)/(R2 + \rho d^2 \cdot R1))(\rho d - \rho 0) - ((Mt \cdot va1 \cdot va2)/(2\omega a(Lt1 \cdot Lt2 - Mt^2)))\cdot \sin \theta$ (17)

Power Pb2 flowing from the second electric device 106 into the power conversion device 101 is represented by Expression (18).

$$Pb2 = ((vb2 \cdot vd1)/(R2 + \rho d^2 \cdot R1))\cdot(\rho d - \rho 0) \qquad (18)$$
$$= -Pb1 - Pb3$$

As described above, by controlling the DC component ρd of the duty ratio ρ and the phase θ of an AC component of the duty ratio ρ, it is possible to control power transmission among the first electric device 102, the second electric device 106, and the third electric device 111 optionally and bidirectionally.

In the claims, a constant component of a duty ratio corresponds to the DC component ρd of the duty ratio ρ. A varying component of a duty ratio corresponds to the AC component of the duty ratio ρ.

Next, a control method for the duty ratio of the power conversion device 101 will be described with reference to FIG. 2.

Figure 2:
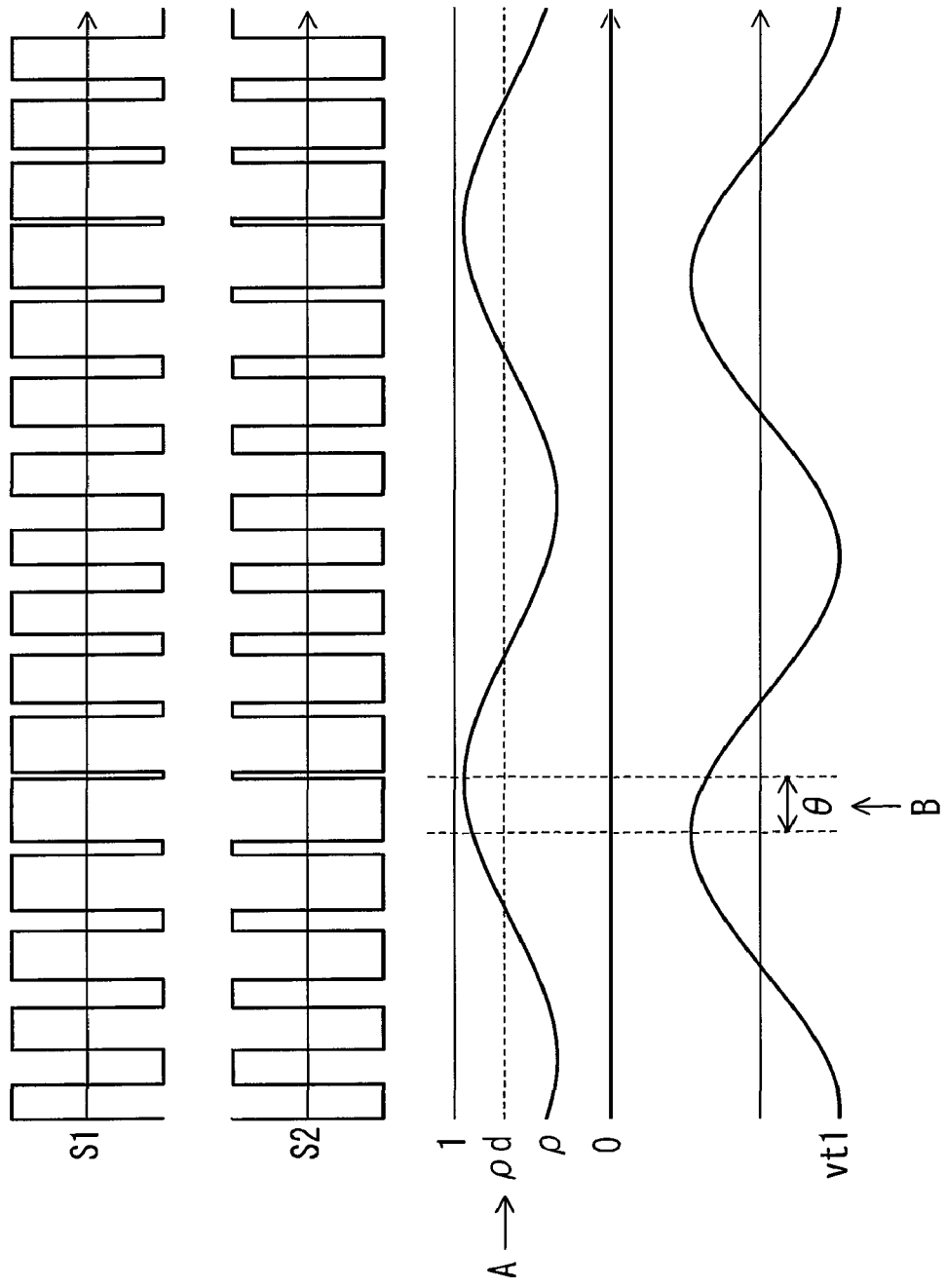
FIG. 2 illustrates a control method for a duty ratio in the power conversion device according to embodiment 1 of the present invention.

FIG. 2 shows a conductive state and a non-conductive state of the switching elements S1, S2 of the half-bridge circuit 110, the duty ratio ρ, and the waveform of voltage of the third electric device, i.e., the voltage vt1 on the primary side of the transformer 112. Power exchange among the first to third electric devices are controlled by varying the center ρd of the duty ratio and the phase difference θ.

In FIG. 2, A indicates the "power control amount to the second electric device", and B indicates the "power control amount from the third electric device".

Next, the relationship between each control amount in the power conversion device 101 and power transmission among the first electric device 102, the second electric device 106, and the third electric device 111, will be described with reference to FIG. 3.

Figure 3:
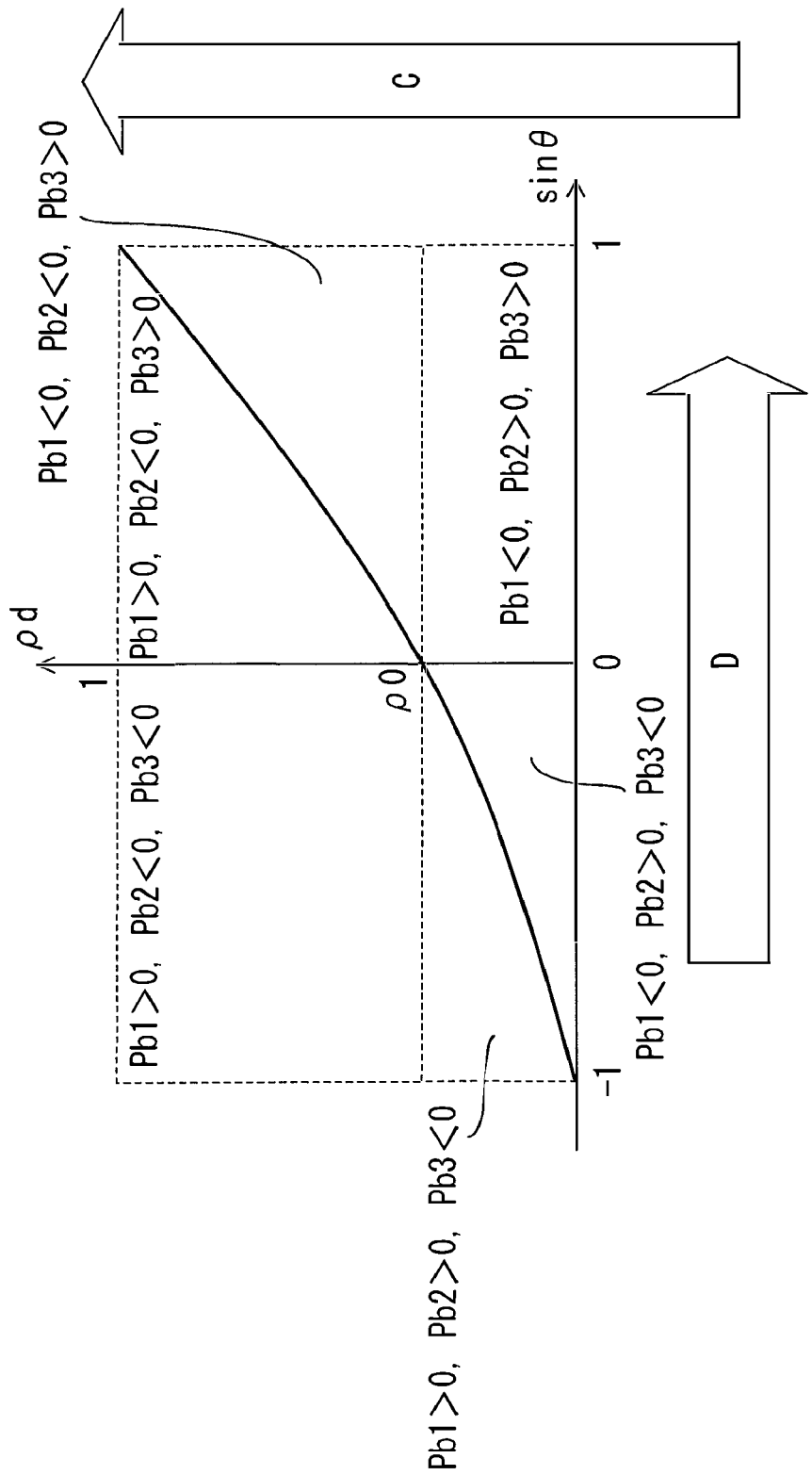
FIG. 3 illustrates the relationship between a control amount and power transmission in the power conversion device according to embodiment 1 of the present invention.

FIG. 3 shows how power is transmitted and received to and from the electric devices, with respect to the center ρd and the phase difference θ of the duty ratio. The horizontal axis in FIG. 3 indicates sin θ, the vertical axis in FIG. 3 indicates ρd, and a curve in FIG. 3 indicates the case of Pb1=0.

In FIG. 3, C indicates the "direction in which power to the second electric device increases", and D indicates the "direction in which power from the third electric device increases". In addition, ρ0=vd2/vd1 is satisfied.

On the side above the curve in FIG. 3, power flows out from the first electric device 102 to another electric device. On the side below the curve in FIG. 3, power flows from another electric device into the first electric device 102.

In a region of ρd<ρ0 in FIG. 3, power flows out from the second electric device 106 to another electric device. In a region of ρd>ρ0 in FIG. 3, power flows from another electric device into the second electric device 106.

In a region of sin θ>0 in FIG. 3, power flows out from the third electric device 111 to another electric device. In a region of sin θ<0 in FIG. 3, power flows from another electric device into the third electric device 111.

Next, a configuration example of the controller 113 of the power conversion device 101 will be described with reference to FIG. 4.

Figure 4:
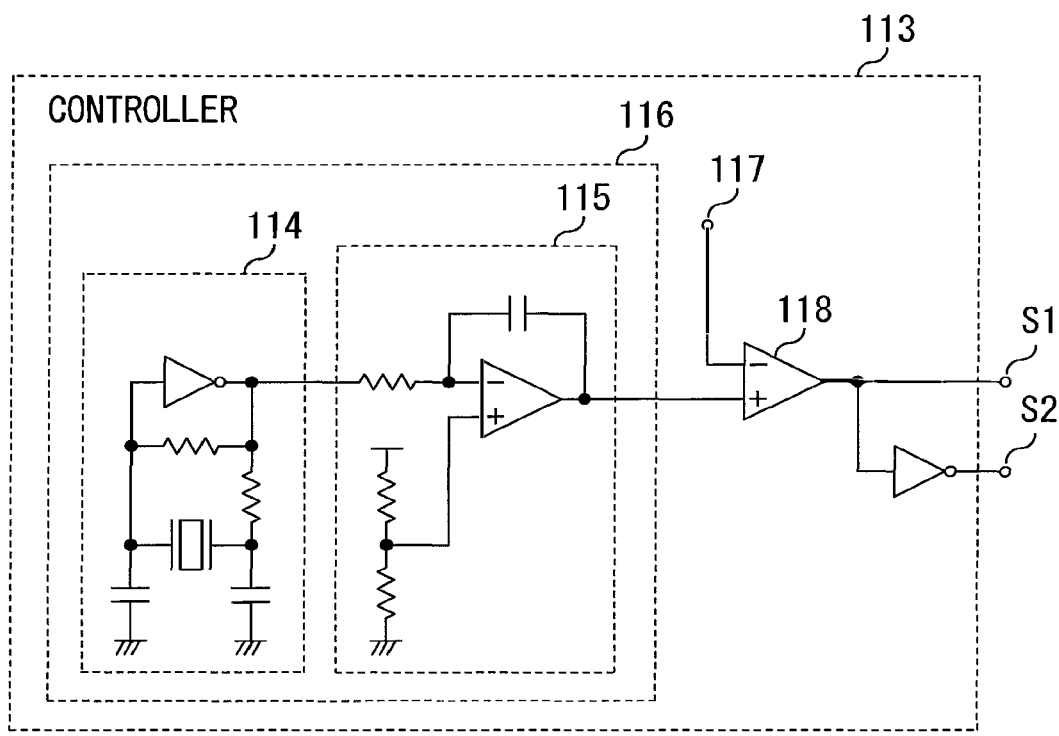
FIG. 4 is a block diagram of a controller in the power conversion device according to embodiment 1 of the present invention.

FIG. 4 is a block diagram showing an example of the controller 113.

The controller 113 shown in embodiment 1 includes a triangular wave generation unit 116 composed of a rectangular wave generation unit 114 and an integral circuit 115, and a comparator 118.

The rectangular wave generation unit 114 generates a rectangular wave having a switching frequency for controlling the switching elements S1 and S2 of the half-bridge circuit 110. The integral circuit 115 converts the rectangular wave from the rectangular wave generation unit 114, to a triangular wave.

The comparator 118 compares the triangular wave outputted from the integral circuit 115 with an input signal 117, to generate a complementary signal for controlling the half-bridge circuit 110.

In this configuration, the duty ratio is proportional to the input signal 117, and therefore, for example, by generating the input signal 117 using a microcontroller or the like, control for the half-bridge circuit 110 in the power conversion device 101 can be achieved.

Specifically, by making the input signal 117 proportional to a desired duty ratio ρ, the duty ratio ρ can be controlled to have a waveform in which a DC component having a desired magnitude is superimposed on an AC component having a desired phase.

In the power conversion device 101 of embodiment 1, the first smoothing circuit 105 is not limited to a combination of a capacitor and an inductor as described in the configuration diagram of FIG. 1. Any circuit that has a similar smoothing function is applicable thereto.

The first electric device 102 and the second electric device 106 may be a DC load such as a light, a DC electric motor, or an inverter, for example. Alternatively, they may be a DC power supply such as a DC power generator, a converter, or a solar battery. Still alternatively, they may be a power storage element such as a storage battery or a capacitor.

Figure 5:
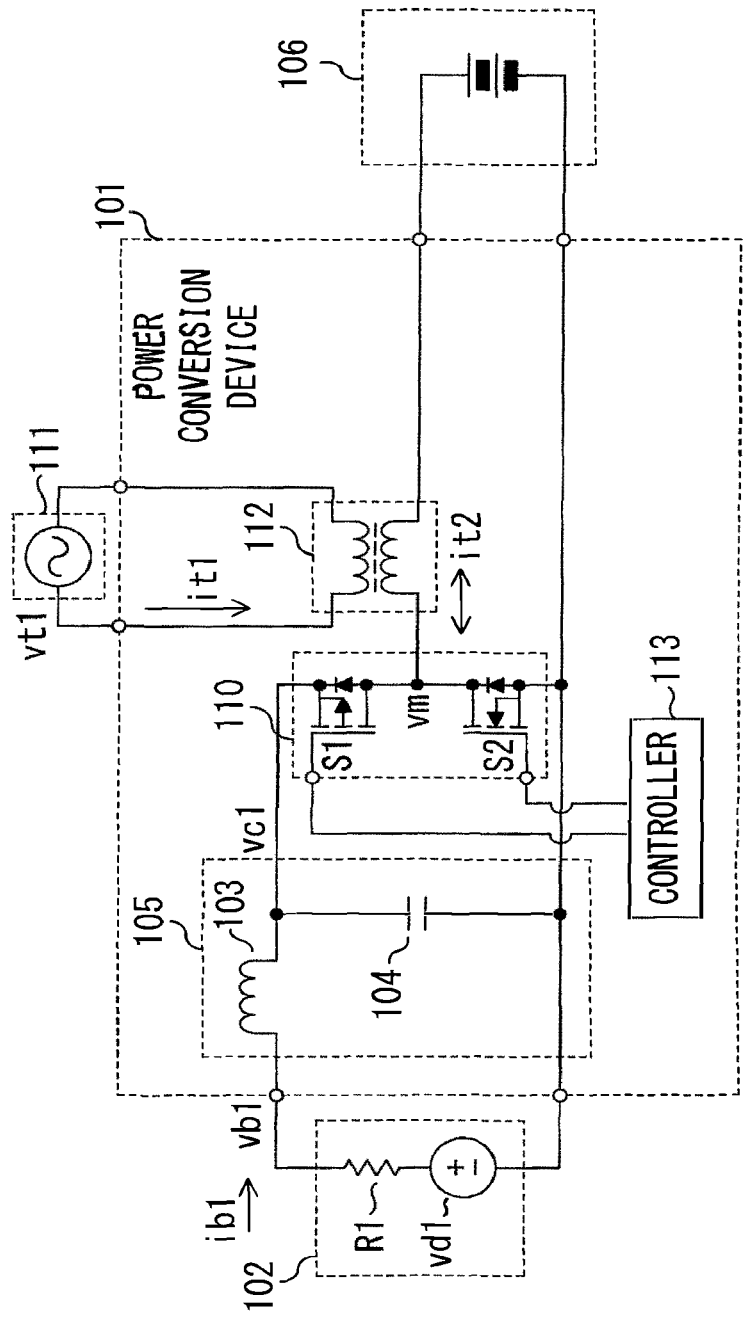
FIG. 5 is another configuration diagram of a power conversion device according to embodiment 1 of the present invention.

FIG. 5 shows a specific example in which the second electric device 106 is a power storage element, as an example of the case where the first electric device 102 or the second electric device 106 is a power storage element.

When the first electric device 102 or the second electric device 106 is a power storage element, the power storage element itself has a smoothing function. Therefore, this power storage element may serve also as a corresponding smoothing circuit.

In FIG. 5, the second electric device 106 is a power storage element and serves also as the second smoothing circuit 106 in FIG. 1.

Alternatively, as described in Non-Patent Document 'M. Uno and K. Tanaka, "Influence of high-frequency charge-discharge cycling induced by cell voltage equalizers on the life performance of lithium-ion cells," IEEE Trans. Vehicular Technol., vol. 60, no. 4, pp. 1505-1516, 2011', it is possible to suppress deterioration due to charging and discharging of a storage battery by setting the frequency of the varying component of the duty ratio ρ in the power conversion device 101 to such a value that an electric double-layer capacitance at a storage battery electrode interface becomes dominant.

Further desirably, the frequency of the varying component of the duty ratio ρ in the power conversion device 101 is set to be around such a frequency that minimizes the internal impedance of the storage battery, whereby heat generation of the storage battery can be suppressed and power loss due to charging and discharging of the storage battery can be minimized.

The third electric device 111 may be a commercial AC grid, for example. Alternatively, the third electric device 111 may be an AC load such as a converter or an AC electric motor. Still alternatively, the third electric device 111 may be an AC power supply such as an AC power generator or an inverter.

Desirably, the switching elements S1 and S2 of the half-bridge circuit 110 are power metal-oxide silicon field-effect transmitters (MOSFET), insulated gate bipolar transistors (IGBT), or the like. However, they may be normal transistors.

Desirably, the controller 113 may be provided with a mechanism for measuring currents, voltages, or powers of the first to third electric devices and adjusting the center ρ0 of the duty ratio and the phase difference θ so that the currents, voltages, or powers have desired values. Such a mechanism may be implemented as software of a microcontroller, for example.

The controller 113 is not limited to the circuit shown in FIG. 4. For example, a signal to be inputted to the half-bridge circuit 110 may be directly generated by a digital signal processor (DSP) or the like.

In the claims, a bridge circuit corresponds to the half-bridge circuit 110.

In the power conversion device 101 of embodiment 1, the first electric device 102 operates with DC current, and therefore, by setting power transmission to the first electric device 102 to zero, it is possible to transmit power between the second electric device 106 and the third electric device 111 bidirectionally while cutting off current to the first electric device 102.

Alternatively, by setting power transmission to the second electric device 106 to zero, it is possible to transmit power between the first electric device 102 and the third electric device 111 bidirectionally while cutting off current to the second electric device 106.

In this case, for example, in application to an uninterruptable power supply or the like, storage batteries are used as the first electric device 102 and the second electric device 106, whereby, while operation of the device is continued with one of the storage batteries, replacement or maintenance of the other storage battery can be performed.

Also, it is possible to perform current exchange between the first electric device 102 and the second electric device 106 without affecting power exchange to and from the third electric device 111. In this way, for example, it is possible to adjust the power storage amounts between the two storage batteries while continuing operation of the storage battery system. Alternatively, while operation of the storage battery system is continued, one of the storage batteries may be operated with a predetermined current pattern, whereby the storage battery can be diagnosed.

Further, by periodically performing power exchange between the first electric device 102 and the second electric device 106, it is possible to increase the temperatures of the storage batteries while continuing operation of the storage battery system, for example.

As described above, the power conversion device according to embodiment 1 includes: the first smoothing circuit connected to the first electric device; the second smoothing circuit connected to the second electric device; the first bridge circuit connected to the first smoothing circuit; the transformer having the primary side connected to the third electric device and the secondary side connected to the first bridge circuit and the second smoothing circuit; and the controller for performing switching control of the bridge circuit, wherein the controller varies the duty ratio of the bridge circuit at a frequency higher than the cutoff frequencies of the first and second smoothing circuits, and the controller controls a constant component of the duty ratio to control DC current flowing between the first electric device and the second electric device, and at the same time, controls the phase of a varying component of the duty ratio. Thus, it is possible to control power transmission among three or more electric devices while performing the power transmission efficiently, with a small-sized and light-weight configuration.

Embodiment 2

A power conversion device according to embodiment 2 is configured so as to utilize a resonance effect between the capacitor of the second smoothing circuit and the secondary-side self-inductance of the transformer in the power conversion device of embodiment 1.

The power conversion device of embodiment 2 has the same configuration as that of the power conversion device 101 of embodiment 1, and therefore, difference from embodiment 1 will be mainly described with reference to FIG. 1.

In the power conversion device of embodiment 2, the capacitor 108 included in the second smoothing circuit 109 is designed so as to provide a resonance effect at the frequency of the AC voltage, together with the secondary-side self-inductance of the transformer 112. Specifically, the secondary-side self-inductance of the transformer 12 and the capacitance of the first capacitor 108 are selected so that the amplitude of variation in the voltage applied to the secondary side of the transformer 112 becomes greater than voltage of the first electric device 102.

In the power conversion device of embodiment 1, the secondary-side voltage of the transformer 112 is limited to a range from −vb2 to vb1-vb2. Therefore, it is impossible to optionally increase the amplitude of AC voltage applied to the secondary side of the transformer 112.

Since the maximum power of the third electric device 111 is proportional to the amplitude of the AC voltage, the power conversion device of embodiment 1 has constraints on power transmission to and from the third electric device 111.

The power conversion device of embodiment 2 eases constraints on power transmission by utilizing a resonance effect between the capacitor 108 and the secondary-side self-inductance of the transformer 112. As a result, the power conversion device of embodiment 2 enables greater power exchange to and from the third electric device 111, as compared to the power conversion device of embodiment 1.

Hereinafter, the resonance effect between the capacitor 108 and the secondary-side self-inductance of the transformer 112 will be described.

Where voltage of the capacitor 108 is vc2, the secondary-side voltage vt2 of the transformer 112 is represented by Expression (19).

$$vt2 = vs + vn = vm - vc2 + vn \quad (19)$$

Where the capacitance of the capacitor 108 is C2, response of vs to vm as an AC value is represented by Expression (20).

$$(d/dt)vs = (d/dt)vm - (d/dt)vc2 = (d/dt)vm - (1/C2) \cdot it2 \quad (20)$$

By satisfying Expression (20) with Expression (7) simultaneously, Expression (21) is obtained.

[Mathematical 3]

$$\frac{d}{dt}\begin{bmatrix} it2 \\ vs \end{bmatrix} = \begin{bmatrix} 0 & \gamma \\ -1/C2 & 0 \end{bmatrix}\begin{bmatrix} it2 \\ vs \end{bmatrix} + \begin{bmatrix} -\beta vt1 + \gamma vn \\ dvm/dt \end{bmatrix} \quad (21)$$

Here, $\beta$ and $\gamma$ are defined as $\beta = Mt/((Lt1 \cdot Lt2 - Mt^2))$ and $\gamma = Lt1/((Lt1 \cdot Lt2 - Mt^2))$.

By solving Expression (21), Expression (22) is obtained.

$$it2 = ((\omega a \cdot \beta \cdot va1)/(\omega a^2 - \gamma/C2)) \cdot \cos \omega at - ((\omega a \cdot \gamma \cdot va2)/(\omega a^2 - \gamma/C2)) \cdot \cos(\omega at + \theta) \quad (22)$$

In addition, Expression (23) is obtained from the equation of the transformer.

$$it1 = -(va1/(\omega a \cdot Lt1)) \cdot \cos \omega at - ((Mt/Lt1) \cdot (\omega a \cdot \beta \cdot va1)/(\omega a^2 - \gamma/C2)) \cdot \cos \omega at + ((Mt/Lt1) \cdot (\omega a \cdot \gamma \cdot va2)/(\omega a^2 - \gamma/C2)) \cdot \cos(\omega at + \theta) \quad (23)$$

As in embodiment 1, power consumption in the third electric device 111 is calculated as shown by Expression (24).

[Mathematical 4]

$$Pb3 = \frac{\omega a}{2\pi} \int_{-\pi/\omega a}^{\pi/\omega a} vt1 \, it1 \, dt \quad (24)$$

$$= \frac{\omega a^2}{\omega a^2 - \gamma/C2} \cdot \frac{Mt va1 va2}{2\omega a(Lt1 Lt2 - Mt^2)} \sin\theta$$

From Expression (12), the maximum value of the power consumption Pb3 of the third electric device 111 in embodiment 1 is represented as follows:

$$(Mt \cdot va1 \cdot va2)/(2\omega a(Lt1 \cdot Lt2 - Mt^2)).$$

In contrast, from Expression (24), the maximum value of the power consumption Pb3 of the third electric device 111 in embodiment 2 is represented as follows:

$$(\omega a^2)/(\omega a^2 - \gamma/C2)) \cdot ((Mt \cdot va1 \cdot va2)/(2\omega a(Lt1 \cdot Lt2 - Mt^2))).$$

Therefore, it is possible to optionally increase the maximum value of the power consumption Pb3 of the third electric device 111 by setting C2 so that a resonance frequency $\sqrt{(\gamma/C2)}$ of the capacitor 108 and the transformer 112 coincides with $\omega a$ or at least becomes close to $\omega a$. As a result, the power conversion device of embodiment 2 enables transmission of greater power to and from the third electric device, in addition to the effects of the power conversion device in embodiment 1.

The power conversion device of embodiment 2 utilizes a resonance effect between the second smoothing circuit 109 and the transformer 112. However, a resonance effect between the first smoothing circuit 105 and the transformer 112 may be utilized. Alternatively, a resonance effect may be utilized with use of both the first smoothing circuit 105 and the second smoothing circuit 109.

As described above, the power conversion device according to embodiment 2 is configured so as to utilize a resonance effect between the capacitor of the second smoothing circuit and the secondary-side self-inductance of the transformer in the power conversion device of embodiment 1. Therefore, the power conversion device of embodiment 2 enables control of power transmission among three or more electric devices while performing the power transmission efficiently, with a small-sized and light-weight configuration, as in embodiment 1. Further, the power conversion device of embodiment 2 enables transmission of greater power to and from the third electric device.

Embodiment 3

A power conversion device according to embodiment 3 is configured such that a second half-bridge circuit connecting the secondary side of the transformer and the second smoothing circuit is added in the power conversion device of embodiment 1.

Figure 6:
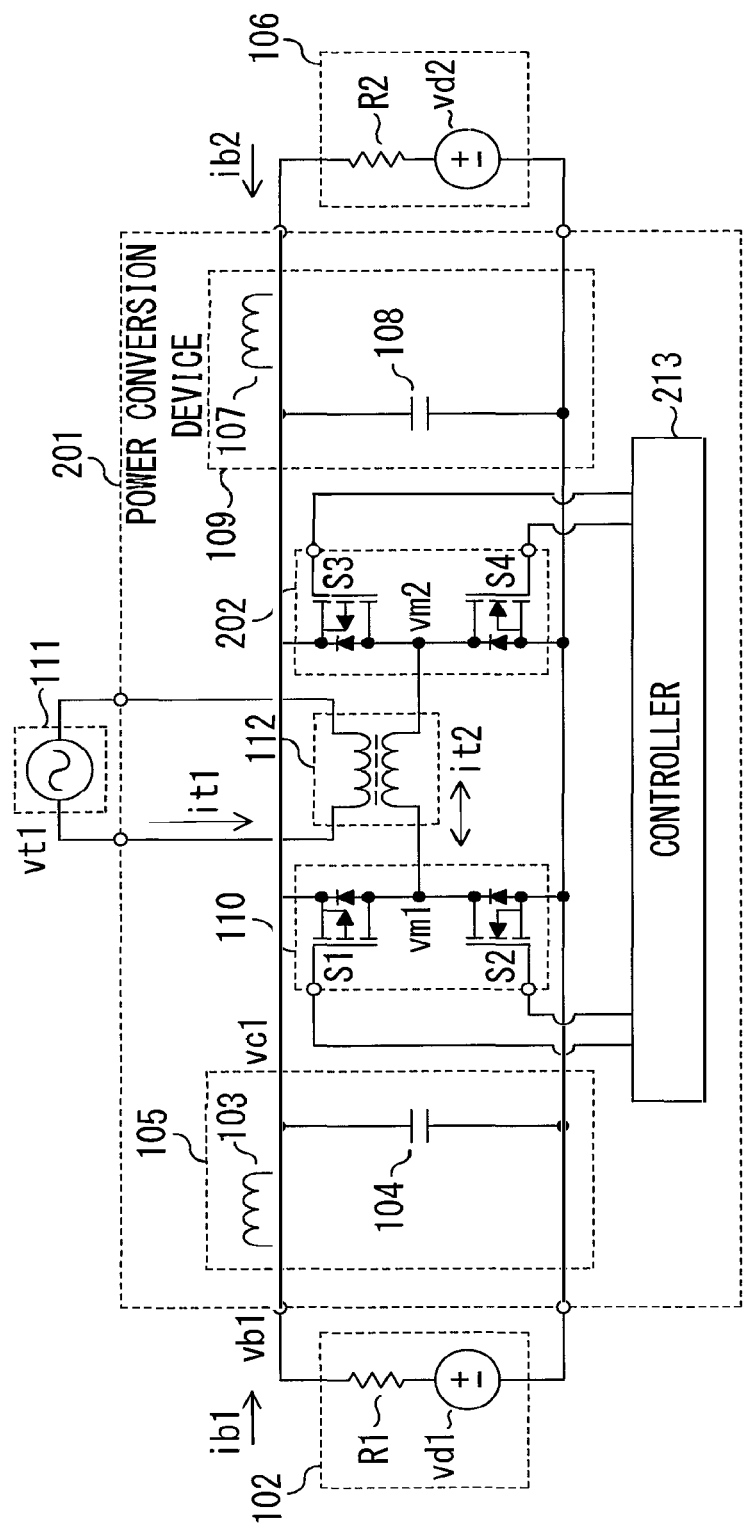
FIG. 6 is a configuration diagram of a power conversion device according to embodiment 3 of the present invention.

Hereinafter, the power conversion device according to embodiment 3 will be described, focusing on difference from embodiment 1, with reference to FIG. 6 which is a configuration diagram of the power conversion device. In FIG. 6, parts that are the same as or correspond to those in FIG. 1 in embodiment 1 are denoted by the same reference characters.

It is noted that the power conversion device and the controller are denoted by 201 and 213, respectively, for discriminating from those in embodiment 1.

First, the configuration of the power conversion device 201 will be described with reference to FIG. 6.

Difference from the configuration of the power conversion device 101 of embodiment 1 is that a second half-bridge circuit 202 is connected between the secondary side of the transformer 112 and the second smoothing circuit 109. The second half-bridge circuit 202 includes switching elements S3 and S4.

The controller 213 is connected to the first half-bridge circuit 110 and the second half-bridge circuit 202, and controls the switching elements S1 and S2 of the first half-bridge circuit 110 and the switching elements S3 and S4 of the second half-bridge circuit 202.

In the power conversion device 201 of embodiment 3, the switching elements S1 and S2 included in the first half-bridge circuit 110 are driven complementarily with each other. Also, the switching elements S3 and S4 included in the second half-bridge circuit 202 are driven complementarily with each other.

By performing PWM control of the switching elements S1 and S2 with a duty ratio ρ1, an average midpoint potential of the first half-bridge circuit 110 can be made to be vm1=ρ1·vb1. Similarly, by performing PWM control of the switching elements S3 and S4 with a duty ratio ρ2, an average midpoint potential of the second half-bridge circuit 202 can be made to be vm2=ρ2·vb2. For the duty ratios ρ1 and ρ2, varying components complementary with each other are superimposed.

In the power conversion device 101 of embodiment 1, the average midpoint potential of the first half-bridge circuit 110 can be made lower than vd1, but cannot be made higher than vd1. Therefore, to transmit power from the first electric device 102 to the second electric device 106, the open circuit voltage vd1 of the first electric device 102 needs to be higher than the open circuit voltage vd2 of the second electric device 106.

In the power conversion device 201 of embodiment 3, the average midpoint potential of the second half-bridge circuit 202 can be made lower than vd2, and therefore, irrespective of whether or not the open circuit voltage vd1 of the first electric device 102 is higher than the open circuit voltage vd2 of the second electric device 106, it is possible to perform bidirectional power transmission between the first electric device 102 and the second electric device 106.

In addition, by oscillating at least one of the duty ratios ρ1 and ρ2 at a frequency higher than the cutoff frequency of the first smoothing circuit 105 or the second smoothing circuit 109, it is possible to transmit power also with the third electric device 111.

The power conversion device 201 of embodiment 3 may be configured so as to utilize a resonance effect between the secondary-side self-inductance of the transformer 112 and at least one of the capacitor 104 included in the first smoothing circuit 105 and the capacitor 108 included in the second smoothing circuit 109, as in the power conversion device of embodiment 2. Such a configuration enables transmission of greater power to and from the third electric device 111, as in the power conversion device of embodiment 2.

As described above, the power conversion device according to embodiment 3 is configured such that the second half-bridge circuit connecting the secondary side of the transformer and the second smoothing circuit is added in the power conversion device of embodiment 1. Therefore, the power conversion device of embodiment 3 enables control of power transmission among three or more electric devices while performing the power transmission efficiently, with a small-sized and light-weight configuration, as in embodiment 1. Further, it is possible to perform bidirectional power transmission between the first electric device and the second electric device irrespective of whether or not the open circuit voltage of the first electric device is higher than the open circuit voltage of the second electric device.

Embodiment 4

A power conversion device according to embodiment 4 is configured such that the third electric device in the power conversion device of embodiment 1 is operated with DC current, and a third smoothing circuit connected to the third electric device, and third and fourth half-bridge circuits connected to the third smoothing circuit, are connected to the primary side of the transformer.

Figure 7:
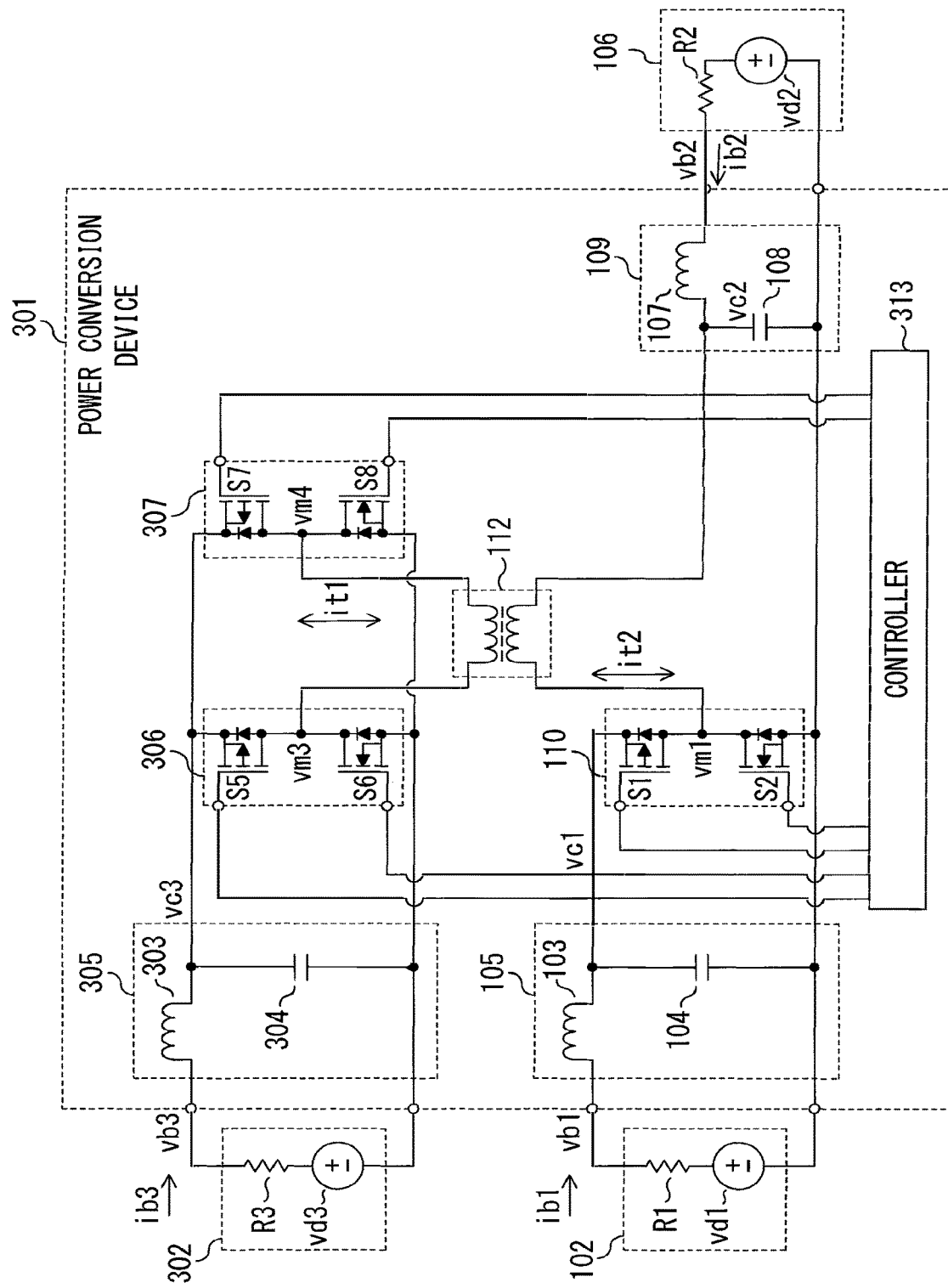
FIG. 7 is a configuration diagram of a power conversion device according to embodiment 4 of the present invention.

Hereinafter, the power conversion device according to embodiment 4 will be described, focusing on difference from embodiment 1, with reference to FIG. 7 which is a configuration diagram of the power conversion device. In FIG. 7, parts that are the same as or correspond to those in FIG. 1 in embodiment 1 are denoted by the same reference characters.

It is noted that the power conversion device, the third electric device, and the controller are denoted by 301, 302, and 313, respectively, for discriminating from those in embodiment 1.

First, the configuration of the power conversion device 301 will be described with reference to FIG. 7.

The power conversion device 301 is different from the power conversion device 101 of embodiment 1 in the configuration on the primary side of the transformer 112.

A third smoothing circuit 305 is connected to the third electric device 302, and a third half-bridge circuit 306 and a fourth half-bridge circuit 307 are connected to the third smoothing circuit 305. The primary side of the transformer 112 is connected to the third half-bridge circuit 306 and the fourth half-bridge circuit 307.

The third smoothing circuit 305 includes a third inductor 303 and a third capacitor 304. The third half-bridge circuit 306 includes switching elements S5 and S6, and the fourth half-bridge circuit 307 includes switching elements S7 and S8.

The controller 313 is connected to the first half-bridge circuit 110, the third half-bridge circuit 306, and the fourth half-bridge circuit 307. The controller 313 controls the switching elements S1, S2, S5, S6, and S7, S8 of the first half-bridge circuit 110, the third half-bridge circuit 306, and the fourth half-bridge circuit 307.

In FIG. 7, ib3 indicates current flowing from the third electric device 302 into the power conversion device 301. In addition, vb3 indicates voltage of the third electric device 302, vd3 indicates the open circuit voltage thereof, and R3 indicates the internal resistance thereof. Further, vc3 is voltage of the capacitor 304, vm3 is the average midpoint potential of the third half-bridge circuit 306, and vm4 is the average midpoint potential of the fourth half-bridge circuit 307.

In the power conversion device 301 of embodiment 4, as in the power conversion device 101 described in embodiment 1, the controller 313 controls the first half-bridge circuit 110 so that DC current is transmitted between the first electric device 102 and the second electric device 106 and AC current having a lower frequency than the switching frequency flows on the secondary side of the transformer 112.

At the same time, the controller 313 controls the third half-bridge circuit 306 and the fourth half-bridge circuit 307 so as to generate the same AC current as in the third electric device 111 of embodiment 1, on the primary side of the transformer 112.

The power conversion device 301 according to embodiment 4 is capable of optionally performing power exchange among the three electric devices operating with DC current. Further, the power conversion device 301 according to embodiment 4 enables the operation frequency of the transformer 112 to be optionally selected, and therefore the transformer 112 can be downsized by setting the operation frequency to a high frequency.

The power conversion device 301 of embodiment 4 may be configured so as to utilize a resonance effect between the secondary-side self-inductance of the transformer 112 and at least one of the capacitor 104 included in the first smoothing circuit 105 and the capacitor 108 included in the second smoothing circuit 109, as in the power conversion device of embodiment 2. Such a configuration enables transmission of greater power to and from the third electric device, as in the power conversion device of embodiment 2.

In the power conversion device 301 of embodiment 4, the third electric device may be a DC load such as a light, a DC electric motor, or an inverter, for example. Alternatively, the third electric device may be a DC power supply such as a DC power generator, a converter, or a solar battery. Still alternatively, the third electric device may be a power storage element such as a storage battery or a capacitor. When the third electric device is a power storage element, the third smoothing circuit 305 may be removed because the storage battery itself has a smoothing function.

As described above, the power conversion device according to embodiment 4 is configured such that the third electric device of the power conversion device in embodiment 1 is operated with DC current, and the third smoothing circuit connected to the third electric device, and the third and fourth half-bridge circuits connected to the third smoothing circuit, are connected to the primary side of the transformer. Therefore, the power conversion device of embodiment 4 enables control of power transmission among three or more electric devices while performing the power transmission efficiently, with a small-sized and light-weight configuration, as in embodiment 1. Further, it is possible to optionally perform power exchange among the three electric devices operating with DC current, the operation frequency of the transformer can be optionally selected, and the transformer can be downsized by setting the operation frequency to a high frequency.

Embodiment 5

A power conversion device according to embodiment 5 is configured such that, in the power conversion device of embodiment 3, the third electric device is operated with DC current, and a third smoothing circuit connected to the third electric device, and third and fourth half-bridge circuits connected to the third smoothing circuit, are connected to the primary side of the transformer.

Figure 8:
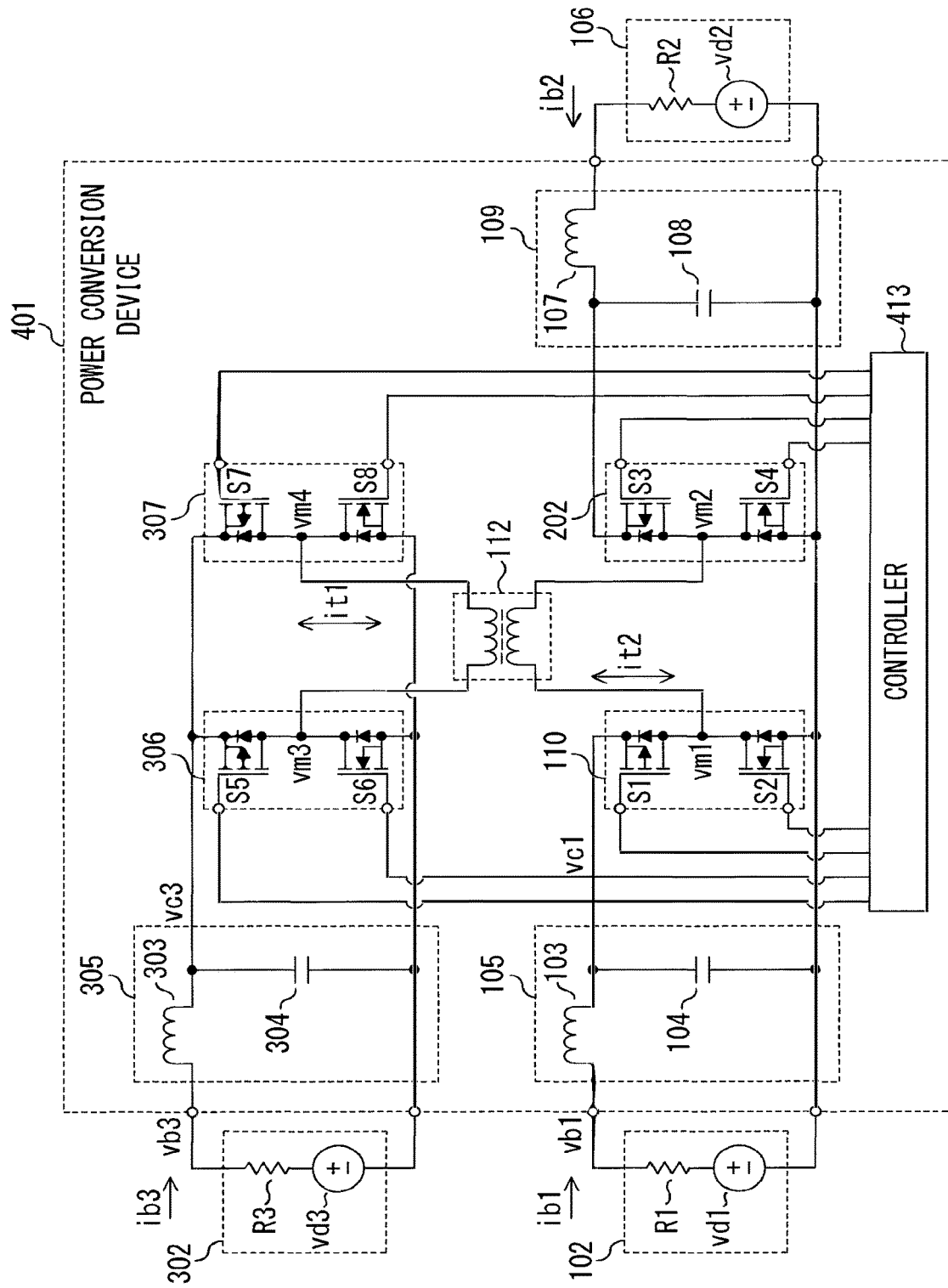
FIG. 8 is a configuration diagram of a power conversion device according to embodiment 5 of the present invention.

Hereinafter, the power conversion device according to embodiment 5 will be described, focusing on difference from embodiment 3, with reference to FIG. 8 which is a configuration diagram of the power conversion device. In FIG. 8, parts that are the same as or correspond to those in FIG. 1 in embodiment 1 or FIG. 6 in embodiment 3 are denoted by the same reference characters.

It is noted that the power conversion device, the third electric device, and the controller are denoted by 401, 302, and 413, respectively, for discriminating from those in embodiments 1 and 3.

First, the configuration of the power conversion device 401 will be described with reference to FIG. 8.

The power conversion device 401 is different from the power conversion device 201 of embodiment 3 in the configuration on the primary side of the transformer 112.

A third smoothing circuit 305 is connected to the third electric device 302. Further, the third smoothing circuit 305 is connected to a third half-bridge circuit 306 and a fourth half-bridge circuit 307. The primary side of the transformer 112 is connected to the third half-bridge circuit 306 and the fourth half-bridge circuit 307.

The third smoothing circuit 305 includes a third inductor 303 and a third capacitor 304. The third half-bridge circuit 306 includes switching elements S5 and S6, and the fourth half-bridge circuit 307 includes switching elements S7 and S8.

The controller 413 is connected to the first half-bridge circuit 110, the second half-bridge circuit 202, the third half-bridge circuit 306, and the fourth half-bridge circuit 307. The controller 313 controls the switching elements S1, S2 to S7, S8 of the first to fourth half-bridge circuits 110 to 307.

The power conversion device 401 according to embodiment 5 is capable of optionally performing power exchange among the three electric devices operating with DC current. Further, the power conversion device 401 according to embodiment 5 enables the operation frequency of the transformer 112 to be optionally selected, and therefore the transformer 112 can be downsized by setting the operation frequency to a high frequency.

The power conversion device 401 according to embodiment 5 enables bidirectional power transmission between the first electric device 102 and the second electric device 106 irrespective of whether or not the open circuit voltage vd1 of the first electric device 102 is higher than the open circuit voltage vd2 of the second electric device 106.

The power conversion device 401 of embodiment 5 may be configured so as to utilize a resonance effect between the secondary-side self-inductance of the transformer 112 and at least one of the capacitor 104 included in the first smoothing circuit 105 and the capacitor 108 included in the second smoothing circuit 109, as in the power conversion device described in embodiment 2. Such a configuration enables transmission of greater power to and from the third electric device, as in the power conversion device of embodiment 2.

As described above, the power conversion device according to embodiment 5 is configured such that, in the power conversion device of embodiment 3, the third electric device is operated with DC current, and the third smoothing circuit connected to the third electric device, and the third and fourth half-bridge circuits connected to the third smoothing circuit, are connected to the primary side of the transformer. Therefore, the power conversion device of embodiment 5 enables control of power transmission among three or more electric devices while performing the power transmission efficiently, with a small-sized and light-weight configuration, as in embodiment 1, and in addition, enables bidirectional power transmission between the first electric device and the second electric device irrespective of whether the open circuit voltage of the first electric device is higher or lower than the open circuit voltage of the second electric device. In addition, it is possible to optionally perform power exchange among the three electric devices operating with DC current. Further, the operation frequency of the transformer can be optionally selected, and the transformer can be downsized by setting the operation frequency to a high frequency.

Embodiment 6

A power conversion device according to embodiment 6 is configured such that the third electric device in the power conversion device of embodiment 1 is operated with DC current, a fourth electric device (DC operation) is further connected, and a third smoothing circuit and a third half-bridge circuit connected to the third electric device, and a fourth smoothing circuit connected to the fourth electric device, are connected to the primary side of the transformer.

Figure 9:
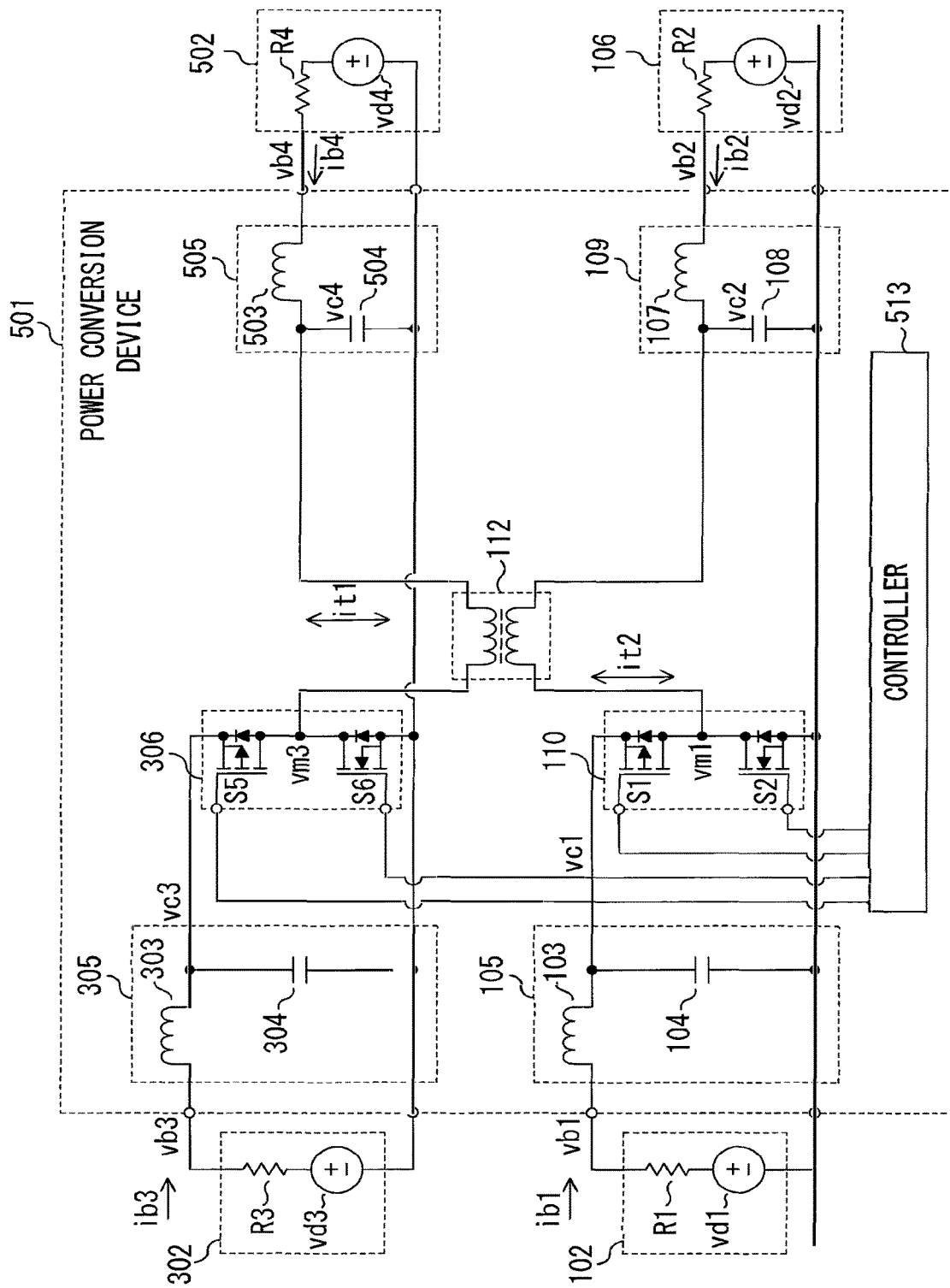
FIG. 9 is a configuration diagram of a power conversion device according to embodiment 6 of the present invention.

Hereinafter, the power conversion device according to embodiment 6 will be described, focusing on difference from embodiment 1, with reference to FIG. 9 which is a configuration diagram of the power conversion device. In FIG. 9, parts that are the same as or correspond to those in FIG. 1 in embodiment 1 are denoted by the same reference characters.

It is noted that the power conversion device, the fourth electric device, and the controller are denoted by 501, 502, and 513, respectively, for discriminating from those in embodiment 1.

First, the configuration of the power conversion device 501 will be described with reference to FIG. 9.

The power conversion device 501 is different from the power conversion device 101 of embodiment 1 in the configuration on the primary side of the transformer 112.

A third smoothing circuit 305 is connected to a third electric device 302, and a third half-bridge circuit 306 is connected to the third smoothing circuit 305.

A fourth electric device 502 is connected to the power conversion device 501, and a fourth smoothing circuit is connected to the fourth electric device 502.

The primary side of the transformer 112 is connected to the third half-bridge circuit 306 and the fourth smoothing circuit.

The third smoothing circuit 305 includes a third inductor 303 and a third capacitor 304. The third half-bridge circuit 306 includes switching elements S5 and S6. The fourth smoothing circuit 505 includes a fourth inductor 503 and a fourth capacitor 504.

The controller 513 is connected to the first half-bridge circuit 110 and the third half-bridge circuit 306.

The controller 513 controls the switching elements S1, S2 and S5, S6 of the first half-bridge circuit 110 and the third half-bridge circuit 306.

In FIG. 9, ib4 indicates current flowing from the fourth electric device 502 into the power conversion device 501. In addition, vb4 indicates voltage of the fourth electric device 502, vd4 indicates the open circuit voltage thereof, R4 indicates the internal resistance thereof, and vc4 indicates voltage of the capacitor 504.

The power conversion device 501 according to embodiment 6 enables power transmission among four electric devices optionally and bidirectionally with a small-sized and light-weight configuration.

Further, the power conversion device 501 according to embodiment 6 enables the operation frequency of the transformer 112 to be optionally selected, and therefore the transformer 112 can be downsized by setting the operation frequency to a high frequency.

The power conversion device 501 of embodiment 6 may be configured so as to utilize a resonance effect between the secondary-side self-inductance of the transformer 112 and at least one of the capacitor 104 included in the first smoothing circuit 105 and the capacitor 108 included in the second smoothing circuit 109.

In addition, the power conversion device 501 of embodiment 6 may be configured so as to utilize a resonance effect between the primary-side self-inductance of the transformer 112 and at least one of the capacitor 304 included in the third smoothing circuit 305 and the capacitor 504 included in the fourth smoothing circuit 505.

The above configuration enables transmission of greater power among the first electric device 102, the second electric device 106, the third electric device 302, and the fourth electric device 502.

In the power conversion device 501 of embodiment 6, the fourth electric device may be a DC load such as a light, a DC electric motor, or an inverter, for example. Alternatively, the fourth electric device may be a DC power supply such as a DC power generator, a converter, or a solar battery. Still alternatively, the fourth electric device may be a power storage element such as a storage battery or a capacitor. When the fourth electric device is a power storage element, the fourth smoothing circuit 505 may be removed because the storage battery itself has a smoothing function.

As described above, the power conversion device according to embodiment 6 is configured such that the third electric device in the power conversion device of embodiment 1 is operated with DC current, the fourth electric device (DC operation) is further connected, and the third smoothing circuit and the third half-bridge circuit connected to the third electric device, and the fourth smoothing circuit connected to the fourth electric device, are connected to the primary side of the transformer. Therefore, the power conversion device of embodiment 6 enables control of power transmission among three or more electric devices while performing the power transmission efficiently, with a small-sized and light-weight configuration, as in embodiment 1. In addition, it is possible to optionally perform power exchange among the four electric devices operating with DC current. Further, the operation frequency of the transformer can be optionally selected, and the transformer can be downsized by setting the operation frequency to a high frequency.

Embodiment 7

A power conversion device according to embodiment 7 is configured such that the third electric device in the power conversion device of embodiment 3 is operated with DC current, a fourth electric device (DC operation) is further connected, and a third smoothing circuit and a third half-bridge circuit connected to the third electric device, and a fourth smoothing circuit connected to the fourth electric device, are connected to the primary side of the transformer.

Figure 10:
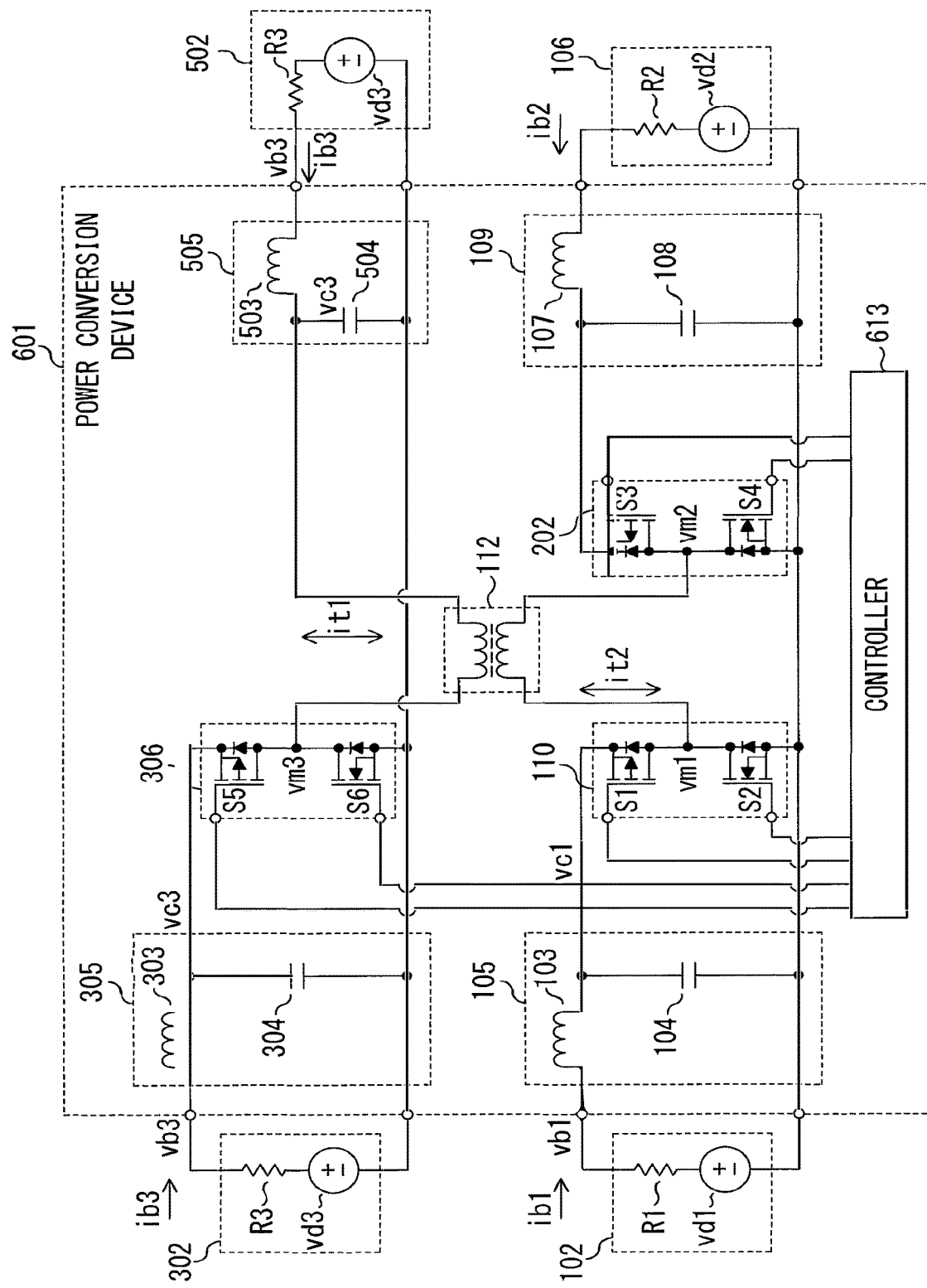
FIG. 10 is a configuration diagram of a power conversion device according to embodiment 7 of the present invention.

Hereinafter, the power conversion device according to embodiment 7 will be described, focusing on difference from embodiment 3, with reference to FIG. 10 which is a configuration diagram of the power conversion device. In FIG. 10, parts that are the same as or correspond to those in FIG. 1 in embodiment 1 or FIG. 6 in embodiment 3 are denoted by the same reference characters.

It is noted that the power conversion device, the third electric device, the fourth electric device, and the controller are denoted by 601, 302, 502, and 613, respectively, for discriminating from those in embodiments 1 and 3.

First, the configuration of the power conversion device 601 will be described with reference to FIG. 10.

The power conversion device 601 is different from the power conversion device 201 of embodiment 3 in the configuration on the primary side of the transformer 112.

A third smoothing circuit 305 is connected to a third electric device 302, and a third half-bridge circuit 306 is connected to the third smoothing circuit 305.

A fourth electric device 502 is connected to the power conversion device 601, and a fourth smoothing circuit is connected to the fourth electric device 502.

The primary side of the transformer 112 is connected to the third half-bridge circuit 306 and the fourth smoothing circuit.

The third smoothing circuit 305 includes a third inductor 303 and a third capacitor 304. The third half-bridge circuit 306 includes switching elements S5 and S6. The fourth smoothing circuit 505 includes a fourth inductor 503 and a fourth capacitor 504.

The controller 613 is connected to the first half-bridge circuit 110, the second half-bridge circuit 202, and the third half-bridge circuit 306. The controller 313 controls the switching elements S1, S2 to S5, S6 of the first to third half-bridge circuits 110 to 306.

The power conversion device 601 according to embodiment 7 is capable of optionally performing power exchange among the four electric devices operating with DC current. Further, the power conversion device 601 according to embodiment 7 enables the operation frequency of the transformer 112 to be optionally selected, and therefore the transformer 112 can be downsized by setting the operation frequency to a high frequency.

The power conversion device 601 according to embodiment 7 enables bidirectional power transmission between the first electric device 102 and the second electric device 106 irrespective of whether or not the open circuit voltage vd1 of the first electric device 102 is higher than the open circuit voltage vd2 of the second electric device 106.

The power conversion device 601 of embodiment 7 may be configured so as to utilize a resonance effect between the secondary-side self-inductance of the transformer 112 and at least one of the capacitor 104 included in the first smoothing circuit 105 and the capacitor 108 included in the second smoothing circuit 109.

In addition, the power conversion device 601 of embodiment 7 may be configured so as to utilize a resonance effect between the primary-side self-inductance of the transformer 112 and at least one of the capacitor 304 included in the third smoothing circuit 305 and the capacitor 504 included in the fourth smoothing circuit 505.

The above configuration enables transmission of greater power among the first electric device 102, the second electric device 106, the third electric device 302, and the fourth electric device 502.

As described above, the power conversion device according to embodiment 7 is configured such that, in the power conversion device of embodiment 3, the third electric device is operated with DC current, the fourth electric device (DC operation) is further connected, and the third smoothing circuit and the third half-bridge circuit connected to the third electric device, and the fourth smoothing circuit connected to the fourth electric device, are connected to the primary side of the transformer. Therefore, the power conversion device of embodiment 7 enables control of power transmission among three or more electric devices while performing the power transmission efficiently, with a small-sized and light-weight configuration, as in embodiment 1, and in addition, enables bidirectional power transmission between the first electric device and the second electric device irrespective of whether the open circuit voltage of the first electric device is higher or lower than the open circuit voltage of the second electric device. In addition, it is possible to optionally perform power exchange among the four electric devices operating with DC current. Further, the operation frequency of the transformer can be optionally selected, and the transformer can be downsized by setting the operation frequency to a high frequency.

Embodiment 8

A power conversion device according to embodiment 8 is configured such that the third electric device in the power conversion device of embodiment 3 is operated with DC current, a fourth electric device (DC operation) is further connected, and a third smoothing circuit and a third half-bridge circuit connected to the third electric device, and a fourth smoothing circuit and a fourth half-bridge circuit connected to the fourth electric device, are connected to the primary side of the transformer.

Figure 11:
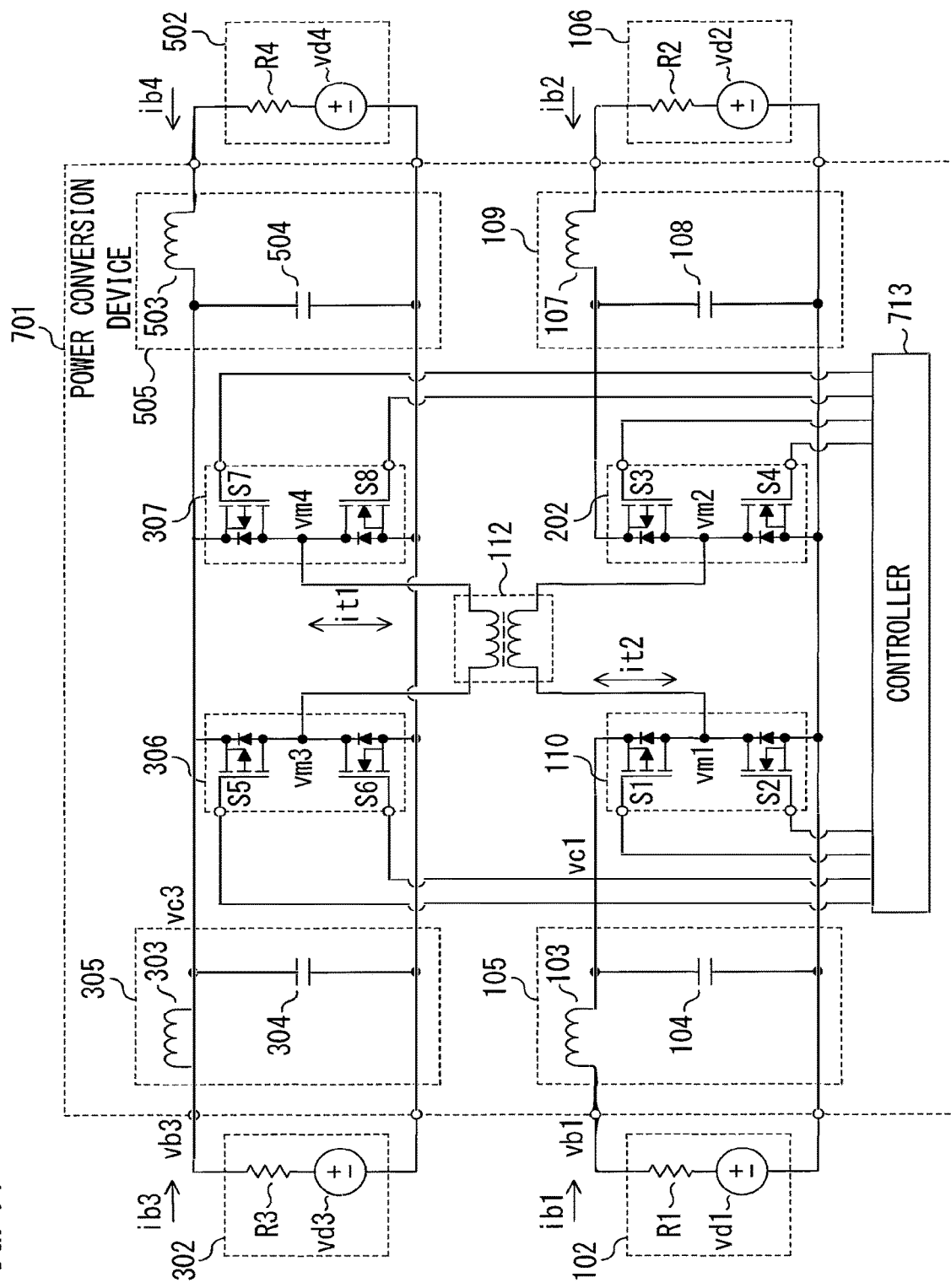
FIG. 11 is a configuration diagram of a power conversion device according to embodiment 8 of the present invention.

Hereinafter, the power conversion device according to embodiment 8 will be described, focusing on difference from embodiment 3, with reference to FIG. 11 which is a configuration diagram of the power conversion device. In FIG. 11, parts that are the same as or correspond to those in FIG. 1 in embodiment 1 or FIG. 6 in embodiment 3 are denoted by the same reference characters.

It is noted that the power conversion device, the third electric device, the fourth electric device, and the controller are denoted by 701, 302, 502, and 713, respectively, for discriminating from those in embodiments 1 and 3.

First, the configuration of the power conversion device 701 will be described with reference to FIG. 11.

The power conversion device 701 is different from the power conversion device 201 of embodiment 3 in the configuration on the primary side of the transformer 112.

A third smoothing circuit 305 is connected to a third electric device 302, and a third half-bridge circuit 306 is connected to the third smoothing circuit 305.

A fourth electric device 502 is connected to the power conversion device 701, and a fourth smoothing circuit and a fourth half-bridge circuit 307 are connected to the fourth electric device 502.

The primary side of the transformer 112 is connected to the third half-bridge circuit 306 and the fourth half-bridge circuit 307.

The third smoothing circuit 305 includes a third inductor 303 and a third capacitor 304. The third half-bridge circuit 306 includes switching elements S5 and S6. The fourth smoothing circuit 505 includes a fourth inductor 503 and a fourth capacitor 504. The fourth half-bridge circuit 307 includes switching elements S7 and S8.

The controller 713 is connected to the first half-bridge circuit 110, the second half-bridge circuit 202, the third half-bridge circuit 306, and the fourth half-bridge circuit 307. The controller 713 controls the switching elements S1, S2 to S7, S8 of the first to fourth half-bridge circuits 110 to 307.

The power conversion device 701 according to embodiment 8 is capable of optionally performing power exchange among the four electric devices operating with DC current. Further, the power conversion device 701 according to embodiment 8 enables the operation frequency of the transformer 112 to be optionally selected, and therefore the transformer 112 can be downsized by setting the operation frequency to a high frequency.

The power conversion device 701 according to embodiment 8 enables bidirectional power transmission between the first electric device 102 and the second electric device 106 irrespective of whether or not the open circuit voltage vd1 of the first electric device 102 is higher than the open circuit voltage vd2 of the second electric device 106.

In addition, the power conversion device 701 according to embodiment 8 enables bidirectional power transmission between the third electric device 302 and the fourth electric device 502 irrespective of whether or not the open circuit voltage vd3 of the third electric device 302 is higher than the open circuit voltage vd4 of the fourth electric device 502.

The power conversion device 701 of embodiment 8 may be configured so as to utilize a resonance effect between the secondary-side self-inductance of the transformer 112 and at least one of the capacitor 104 included in the first smoothing circuit 105 and the capacitor 108 included in the second smoothing circuit 109.

In addition, the power conversion device 701 of embodiment 8 may be configured so as to utilize a resonance effect between the primary-side self-inductance of the transformer 112 and at least one of the capacitor 304 included in the third smoothing circuit 305 and the capacitor 504 included in the fourth smoothing circuit 505.

The above configuration enables transmission of greater power among the first electric device 102, the second electric device 106, the third electric device 302, and the fourth electric device 502.

As described above, the power conversion device according to embodiment 7 is configured such that, in the power conversion device of embodiment 3, the third electric device is operated with DC current, the fourth electric device (DC operation) is further connected, and the third smoothing circuit and the third half-bridge circuit connected to the third electric device, and the fourth smoothing circuit and the fourth half-bridge circuit connected to the fourth electric device, are connected to the primary side of the transformer. Therefore, the power conversion device of embodiment 8 enables control of power transmission among three or more electric devices while performing the power transmission efficiently, with a small-sized and light-weight configuration, as in embodiment 1, and in addition, enables bidirectional power transmission between the first electric device and the second electric device irrespective of whether the open circuit voltage of the first electric device is higher or lower than the open circuit voltage of the second electric device. In addition, it is possible to perform bidirectional power transmission between the third electric device and the forth electric device irrespective of whether the open circuit voltage of the third electric device is higher or lower than the open circuit voltage of the fourth electric device. In addition, it is possible to optionally perform power exchange among the four electric devices operating with DC current. Further, the operation frequency of the transformer can be optionally selected, and the transformer can be downsized by setting the operation frequency to a high frequency.

It is noted that, within the scope of the present invention, the above embodiments may be freely combined with each other, or each of the above embodiments may be modified or simplified as appropriate.

INDUSTRIAL APPLICABILITY

The present invention enables control of power transmission among three or more electric devices while performing the power transmission efficiently, with a small-sized and light-weight configuration, and therefore is applicable to a wide range of power conversion devices that control power transmission.

The invention claimed is:

1. A power conversion device comprising:
   a first smoothing circuit connected to a first electric device;
   a second smoothing circuit connected to a second electric device;
   a first bridge circuit connected to the first smoothing circuit;
   a transformer having a primary side connected to a third electric device and a secondary side connected to the first bridge circuit and the second smoothing circuit; and
   a controller for performing switching control of the first bridge circuit, wherein
   the controller varies a duty ratio of the first bridge circuit at a frequency higher than a cutoff frequency of the first smoothing circuit and a cutoff frequency of the second smoothing circuit, and the controller controls a constant component of the duty ratio to control power exchange between the first electric device and the second electric device, and at the same time, controls a phase of a varying component of the duty ratio to control power exchange to and from the third electric device.

2. The power conversion device according to claim 1, wherein
   the first smoothing circuit includes a first inductor and a first capacitor, and
   a secondary-side self-inductance of the transformer and a capacitance of the first capacitor are set so that an amplitude of variation in voltage applied to the secondary side of the transformer becomes greater than voltage of the first electric device owing to a resonance effect between the first capacitor and the secondary-side self-inductance of the transformer.

3. The power conversion device according to claim 1, wherein
   the second smoothing circuit includes a second inductor and a second capacitor, and
   a secondary-side self-inductance of the transformer and a capacitance of the second capacitor are set so that an amplitude of variation in voltage applied to the secondary side of the transformer becomes greater than voltage of the first electric device owing to a resonance effect between the second capacitor and the secondary-side self-inductance of the transformer.

4. The power conversion device according to claim 1, wherein
   the first smoothing circuit includes a first inductor and a first capacitor, and the second smoothing circuit includes a second inductor and a second capacitor, and
   a secondary-side self-inductance of the transformer and capacitances of the first and second capacitors are set so that an amplitude of variation in voltage applied to the secondary side of the transformer becomes greater than voltage of the first electric device owing to a resonance effect between the secondary-side self-inductance of the transformer, and the first capacitor and the second capacitor.

5. The power conversion device according to claim 1, wherein
   the second smoothing circuit is connected to the secondary side of the transformer via a second bridge circuit, and the controller varies the duty ratio of the first bridge circuit and a duty ratio of the second bridge circuit complementarily with each other.

6. The power conversion device according to claim 1, further comprising:
a third smoothing circuit connected to the third electric device;
a third bridge circuit connected to the third smoothing circuit; and
a fourth bridge circuit connected to the third smoothing circuit, wherein
the primary side of the transformer is connected to the third bridge circuit and the fourth bridge circuit, and
the controller controls the first bridge circuit, the third bridge circuit, and the fourth bridge circuit.

7. The power conversion device according to claim 5, further comprising:
a third smoothing circuit connected to the third electric device;
a third bridge circuit connected to the third smoothing circuit; and
a fourth bridge circuit connected to the third smoothing circuit, wherein
the primary side of the transformer is connected to the third bridge circuit and the fourth bridge circuit, and
the controller controls the first to fourth bridge circuits.

8. The power conversion device according to claim 1, further comprising:
a third smoothing circuit connected to the third electric device;
a fourth smoothing circuit connected to a fourth electric device; and
a third bridge circuit connected to the third smoothing circuit, wherein
the primary side of the transformer is connected to the third bridge circuit and the fourth smoothing circuit, and
the controller controls the first bridge circuit and the third bridge circuit.

9. The power conversion device according to claim 5, further comprising:
a third smoothing circuit connected to the third electric device;
a fourth smoothing circuit connected to a fourth electric device; and
a third bridge circuit connected to the third smoothing circuit, wherein
the primary side of the transformer is connected to the third bridge circuit and the fourth smoothing circuit, and
the controller controls the first bridge circuit, the second bridge circuit, and the third bridge circuit.

10. The power conversion device according to claim 9, further comprising a fourth bridge circuit connected to the fourth smoothing circuit, wherein
the primary side of the transformer is connected to the third bridge circuit and the fourth bridge circuit, and
the controller controls the first to fourth bridge circuits.

11. The power conversion device according to claim 1, wherein
at least one of the first electric device and the second electric device is a power storage device, and
the power storage device serves also as the first smoothing circuit or the second smoothing circuit.

12. The power conversion device according to claim 11, wherein
a frequency of the varying component of the duty ratio is set to such a value that an electric double-layer capacitance at a storage battery electrode interface of a storage battery that is the power storage device becomes dominant.

13. The power conversion device according to claim 1, wherein
the controller includes a triangular wave generation unit for generating a triangular wave that oscillates at a switching frequency of each bridge circuit, and a comparator for comparing therewith a signal proportional to the duty ratio, and controls a switching element of the bridge circuit in accordance with output from the comparator.

14. The power conversion device according to claim 2, wherein
the second smoothing circuit is connected to the secondary side of the transformer via a second bridge circuit, and
the controller varies the duty ratio of the first bridge circuit and a duty ratio of the second bridge circuit complementarily with each other.

15. The power conversion device according to claim 2, further comprising:
a third smoothing circuit connected to the third electric device;
a third bridge circuit connected to the third smoothing circuit; and
a fourth bridge circuit connected to the third smoothing circuit, wherein
the primary side of the transformer is connected to the third bridge circuit and the fourth bridge circuit, and
the controller controls the first bridge circuit, the third bridge circuit, and the fourth bridge circuit.

16. The power conversion device according to claim 2, further comprising:
a third smoothing circuit connected to the third electric device;
a fourth smoothing circuit connected to a fourth electric device; and
a third bridge circuit connected to the third smoothing circuit, wherein
the primary side of the transformer is connected to the third bridge circuit and the fourth smoothing circuit, and
the controller controls the first bridge circuit and the third bridge circuit.

17. The power conversion device according to claim 2, wherein
at least one of the first electric device and the second electric device is a power storage device, and
the power storage device serves also as the first smoothing circuit or the second smoothing circuit.

18. The power conversion device according to claim 2, wherein
the controller includes a triangular wave generation unit for generating a triangular wave that oscillates at a switching frequency of each bridge circuit, and a comparator for comparing therewith a signal proportional to the duty ratio, and controls a switching element of the bridge circuit in accordance with output from the comparator.

19. The power conversion device according to claim 14, further comprising:
- a third smoothing circuit connected to the third electric device;
- a third bridge circuit connected to the third smoothing circuit; and
- a fourth bridge circuit connected to the third smoothing circuit, wherein
- the primary side of the transformer is connected to the third bridge circuit and the fourth bridge circuit, and
- the controller controls the first to fourth bridge circuits.

20. The power conversion device according to claim 14, further comprising:
- a third smoothing circuit connected to the third electric device;
- a fourth smoothing circuit connected to a fourth electric device; and
- a third bridge circuit connected to the third smoothing circuit, wherein
- the primary side of the transformer is connected to the third bridge circuit and the fourth smoothing circuit, and
- the controller controls the first bridge circuit, the second bridge circuit, and the third bridge circuit.

\* \* \* \* \*